United States Patent
Karuppiah et al.

(10) Patent No.: US 11,516,136 B2
(45) Date of Patent: Nov. 29, 2022

(54) DISTRIBUTED NODE PROCESSING OF NETWORK TRAFFIC

(71) Applicant: Juniper Networks, Inc., Sunnyvale, CA (US)

(72) Inventors: Vijay Anand Karuppiah, San Jose, CA (US); Mohit Joshi, Bangalore (IN); Suresh Vishwanathan, Bangalore (IN); Sankar Ramamoorthi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 156 days.

(21) Appl. No.: 17/132,171

(22) Filed: Dec. 23, 2020

(65) Prior Publication Data

US 2021/0385167 A1 Dec. 9, 2021

(30) Foreign Application Priority Data

Jun. 4, 2020 (IN) .............................. 202041023476

(51) Int. Cl.
*H04L 47/22* (2022.01)
*H04L 47/2483* (2022.01)
*H04L 45/50* (2022.01)

(52) U.S. Cl.
CPC .............. *H04L 47/22* (2013.01); *H04L 45/50* (2013.01); *H04L 47/2483* (2013.01)

(58) Field of Classification Search
CPC ..... H04L 47/22; H04L 47/2483; H04L 45/44; H04L 45/50
See application file for complete search history.

(56) References Cited

U.S. PATENT DOCUMENTS

| | | | | |
|---|---|---|---|---|
| 9,178,809 | B1* | 11/2015 | Shen | H04L 12/4633 |
| 9,344,359 | B1* | 5/2016 | Tiruveedhula | H04L 45/16 |
| 2016/0072669 | A1* | 3/2016 | Saavedra | H04L 69/14 |
| | | | | 709/220 |
| 2018/0131578 | A1* | 5/2018 | Cui | H04L 41/40 |
| 2018/0351862 | A1* | 12/2018 | Jeganathan | H04L 45/02 |
| 2019/0020738 | A1* | 1/2019 | Paul | H04L 45/58 |
| 2019/0052561 | A1* | 2/2019 | Osborne | H04L 45/04 |
| 2019/0363927 | A1* | 11/2019 | Ganeriwal | H04L 45/58 |
| 2020/0162380 | A1* | 5/2020 | Pilkington | H04L 47/2433 |
| 2020/0396301 | A1* | 12/2020 | Abhigyan | H04W 40/02 |

(Continued)

*Primary Examiner* — Chi H Pham
*Assistant Examiner* — Vladislav Y Agureyev
(74) *Attorney, Agent, or Firm* — Harrity & Harrity, LLP

(57) ABSTRACT

A first network device may receive first traffic of a session that involves a service. The first network device may identify that the service is configured for distributed node processing. The first network device may identify a second network device that is configured for distributed node processing. The first network device may identify a state machine that is associated with the service. The first network device may determine, based on the state machine, a first function and a second function, wherein the first function is identified by a first label and the second function is identified by a second label. The first network device may process the first traffic based on the first function. The first network device may provide, to the second network device, the first traffic and the second label to permit the second network device to process second traffic in association with the second function.

20 Claims, 21 Drawing Sheets

(56) References Cited

U.S. PATENT DOCUMENTS

| | | | |
|---|---|---|---|
| 2021/0092068 A1* | 3/2021 | Ismailsheriff | H04L 47/22 |
| 2021/0235313 A1* | 7/2021 | Devadoss | H04L 45/50 |
| 2021/0306206 A1* | 9/2021 | Bugenhagen | H04L 12/1868 |

* cited by examiner

DISTRIBUTED NODE PROCESSING OF NETWORK TRAFFIC

CROSS-REFERENCE TO RELATED APPLICATION

This application claims priority to Indian Provisional Application No. 202041023476 entitled "DISTRIBUTED NODE PROCESSING OF NETWORK TRAFFIC," filed on Jun. 4, 2020. The entire content of which is expressly incorporated herein by reference.

BACKGROUND

A controlled network may include a controller that manages a group of nodes, and communication paths connecting the group of nodes, included in the controlled network.

SUMMARY

According to some implementations, a method may include receiving, by a first network device of a network, first traffic of a session that involves a service; identifying, by the first network device and based on the first traffic, that the service is configured for distributed node processing; identifying, by the first network device and based on determining that the service is configured for distributed node processing, a second network device of the network that is configured for distributed node processing; identifying, by the first network device, a function state machine that is associated with using distributed node processing for the service, wherein the function state machine identifies a plurality of functions of the service and tasks associated with the plurality of functions; determining, by the first network device and based on the function state machine, a first function, of the plurality of functions, for processing by the first network device, and a second function, of the plurality of functions, for processing by the second network device, wherein the first function is identified by a first label and the second function is identified by a second label; processing, by the first network device, the first traffic in association with the first function to facilitate communication via the session; and providing, by the first network device and to the second network device, the first traffic and the second label associated with the second function to permit the second network device to process second traffic in association with the second function of the service.

According to some implementations, a first network device may include one or more memories and one or more processors. The one or more processors may be configured to: receive first traffic of a session that involves a service of a network, wherein the service is to be processed using distributed node processing; identify, based on a traffic path for the session, a second network device of the network that is configured for distributed node processing; identify, based on the first traffic, a function state machine that is associated with using distributed node processing for the service, wherein the function state machine identifies a plurality of functions of the service and tasks associated with the plurality of functions; determine a function of the plurality of functions for processing the first traffic, wherein the function is determined based on a state transition, of the function state machine, that is associated with receiving the first traffic, wherein the state transition is associated with a task of the function; identify, from the function state machine, a label associated with the state transition; process the first traffic in association with the function to facilitate communication via the session; and provide, to the second network device, the first traffic and the label to permit the second network device to process second traffic in association with a subsequent function of the function state machine.

According to some implementations, a non-transitory computer-readable medium may store one or more instructions. The one or more instructions, when executed by one or more processors of a first network device, may cause the one or more processors to: receive first traffic of a session that involves a service of a network; identify, based on the first traffic, a traffic path of the session; determine, based on receiving the first traffic and a location of the first network device within the traffic path, a state transition of a function state machine, wherein the function state machine identifies a plurality of functions of the service and tasks associated with the plurality of functions; determine, based on the state transition, a label associated with using distributed node processing for the service; process the first traffic in association with a function that is associated with the state transition; and provide, to a second network device of the network, the first traffic and the label to permit the second network device to process second traffic to facilitate performance of the service.

DETAILED DESCRIPTION

Figure 1A:
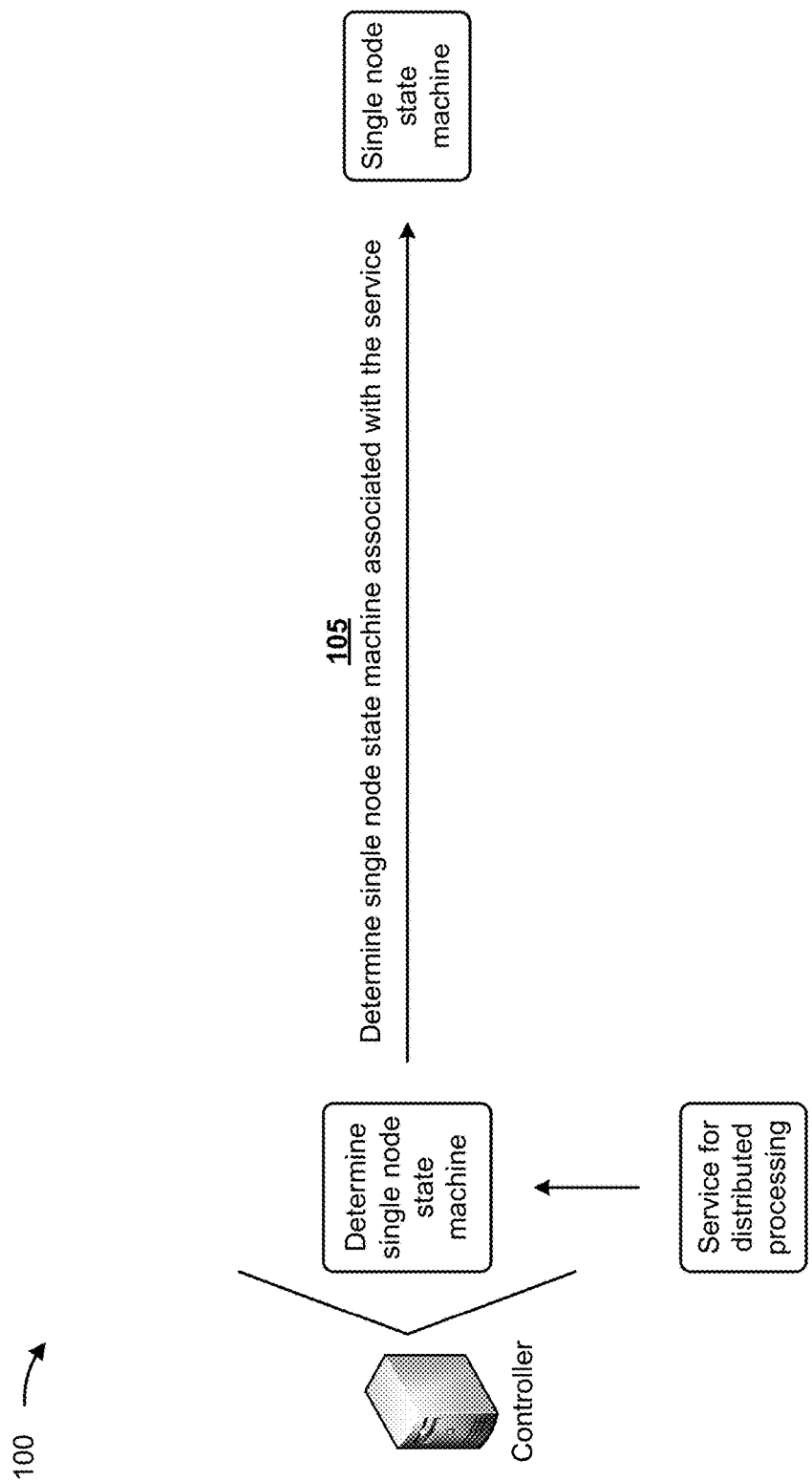
FIGS. 1A-1O are diagrams of an example implementation described herein.

The following detailed description of example implementations refers to the accompanying drawings. The same reference numbers in different drawings may identify the same or similar elements.

A network may be configured to provide a service (e.g., a security service, a cloud-based content-caching service, a web caching service, a content delivery service, and/or the like) associated with traffic transmitted through the network. The service may be provided by a single node of the network processing traffic received by the node according to a plurality of functions associated with the service. For example, a packet entering the network may be received by a node (e.g., an ingress router, a provider edge (PE) device, and/or the like) located at an edge of the network. The node may perform processing associated with providing the service on the packet and may forward the packet through the network. When another node included in the network receives the packet, the other node may forward the packet towards a destination without performing any processing.

By utilizing a single node to provide the service, a capacity of the network may be limited based on a capability of the computing resources (e.g., processing resources, memory resources, communication resources, and/or the like) of the single node. Thus, increasing a capacity of the network may require the computing resources of the single node to be increased, the replacement of the single node with a node having more computing resources, and/or the like thereby resulting in an increase in a cost associated with providing the service.

Further, utilizing the single node to perform processing associated with providing the service may create a vulnerability and/or increase a security risk associated with the network. For example, a failure of the single node may prevent the network from being able to provide the service, a malicious actor may target an attack at the single node to prevent the network from providing the service, and/or the like.

Some implementations described herein may distribute the performance of processing associated with providing a service to multiple nodes included in a network. For example, a controller may identify a service for distributed node processing. The service may be provided based on processing traffic according to a plurality of functions. The controller may use a distributed state machine and a set of labels to distribute the plurality of functions to a plurality of nodes included in the network. A node may receive the distributed state machine and the set of labels and may process a packet according to one or more of the plurality of functions based on a state of the distributed state machine.

The node may identify a label, from the set of labels, associated with the state of the distributed state machine. The label may include information indicating a current state of the distributed state machine and information identifying another node to which the packet is to be forwarded for processing according to a next function of the plurality of functions. The node may forward the packet and the label to the other node based on the label. The other node may receive the packet and the label and may determine a current state of the distributed node state machine based on the label. The other node may process the packet according to one or more functions, of the plurality of functions, associated with the current state of the distributed node state machine.

In this way, the controller may distribute the performance of processing associated with providing the service to multiple nodes included in the network. By distributing the performance of the processing to multiple nodes included in the network, a capacity of the network (e.g., an amount of traffic that can be processed by the network) may be increased relative to networks that perform processing associated with providing the service at a single node. Thus, the capacity of the network may be increased without requiring a corresponding increase in the computing resources of a single node thereby reducing a cost associated with increasing the capacity of the network.

Further, distributing the performance of processing associated with providing the service to multiple nodes included in the network may prevent a vulnerability from being created and/or reduce a security risk associated with the network. For example, a malicious actor may not be able to identify and/or attack a single node to prevent the network from being able to perform the service. Additionally, in the event of a failure of a single node, the controller may distribute functions associated with the failed to node to another node by distributing a modified distributed node state machine and/or a new set of labels. In this way, the network may continue to provide the service despite the failure of the node.

FIGS. 1A-1O are diagrams of one or more example implementations 100 described herein. As shown in FIGS. 1A-1O, a controlled network includes a controller, a first node (e.g., node, as shown in FIG. 1G), and a second node (e.g., node 2, as shown in FIG. 1G) that utilize distributed node state machines and labels to perform distributed node processing, as described herein.

The controller may be a network device (e.g., a server device, a router, a switch, and/or the like) that manages each node in the controlled network (e.g., the node 1, the node 2, and/or the like) and manages the paths connecting the nodes of the controlled network. In some implementations, the controller is one of the nodes in the controlled network. The controller may identify a service (e.g., a security service, a cloud-based content-caching service, a web caching service, a content delivery service, and/or the like) for distributed node processing.

The controller may obtain a distributed node state machine associated with the service. In some implementations, the controller may obtain the distributed node state machine on a per service basis. As an example, the controller may obtain a first distributed node state machine for a first type of service, a second distributed node state machine for a second type of service, and so on.

In some implementations, the controller obtains the distributed node state machine from another device. For example, the controller may obtain the distributed node state machine from a network management device storing a plurality of distributed node state machines associated with a plurality of services. The controller may request, from the network management device, a distributed node state machine associated with the service. The network management device may provide the distributed node state machine to the controller based on the request. Alternatively, and/or additionally, the controller may obtain the distributed node state machine from a client device (e.g., a computing device, a mobile device, and/or the like). A user may generate the distributed node state machine and may cause a client device to provide the distributed node state machine to the controller.

In some implementations, the controller generates the distributed node state machine from a single node state machine associated with the service. As shown in FIG. 1A, and by reference number 105, the controller determines a single node state machine associated with the service. The single node state machine may be utilized by a single node (e.g., the node 1) to perform an entirety of the processing for providing the service. The single node state machine may include a plurality of functions associated with a plurality of states and/or state transitions associated with providing the service.

Figure 1B:
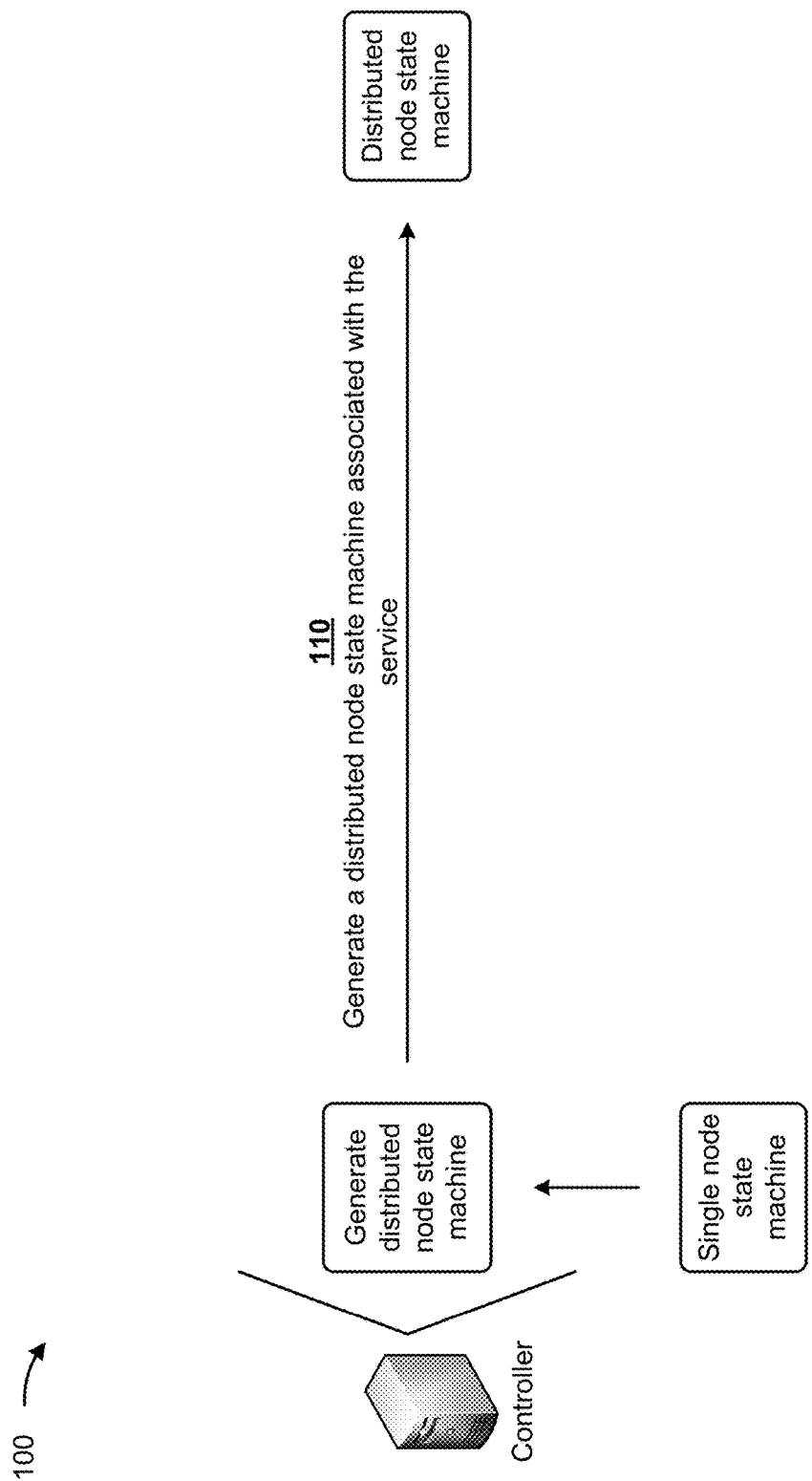

As shown in FIG. 1B, and by reference number 110, the controller generates the distributed node state machine associated with the service based on the single node state machine. As described above, the single node state machine may include a plurality of functions associated with a plurality of states and/or state transitions. The controller may generate the distributed node state machine based on distributing the performance of the plurality of functions to a plurality of nodes included in the network. The controller may divide the plurality of functions into two or more subsets of functions to generate two or more function state machines (e.g., where a single subset of functions may be included in a single function state machine).

The single node state machine may include a first function that is associated with a first or initial state of the single node state machine, a second function that is associated with a second state of the single node state machine, and/or the like. The controller may analyze the single node state machine and divide the plurality of functions into the two or more subsets of functions. The controller may use one or more factors to determine how to divide the plurality of functions into the two or more subsets of functions.

In some implementations, the one or more factors include a determination as to which node is first to receive a packet on which a function is to be performed. The controller may divide the plurality of functions into a first group of functions performed on request traffic (e.g., a request for content, a request to establish a communication session, and/or the like) and a second group of functions performed on traffic transmitted in response to the initial traffic. For example, the controller may determine that an ingress node (or an egress node) that receives an HTTP GET request from a device external to the controlled network is to process the request according to a network address translation (NAT) function based on the ingress node (or the egress node) being the first node in the controlled network to receive the HTTP GET request. The controller may determine that an egress node (or an ingress node) that receives a response to the HTTP GET request from a device external to the controlled network is to process the response according to an intrusion detection and prevention (IDP) function based on the egress node (or the ingress node) being the first node in the controlled network to receive the response.

In some implementations, the one or more factors include a quantity of communication sessions. The controller may determine a quantity of communication sessions associated with the controlled network. The controller may divide the functions based on the quantity of communication sessions. For example, the controller may divide the plurality of functions into a first quantity of groups when the quantity of communication sessions satisfies a first threshold. The controller may divide the plurality of functions into a second quantity of groups when the quantity of communication sessions satisfies a second threshold. In this way, the controller may distribute the plurality of functions to a larger quantity of nodes during periods when the controlled network is experiencing a high volume of traffic and/or communication sessions. By distributing the plurality of functions to a larger quantity of nodes, the controller may balance a workload of each node.

In some implementations, the one or more factors include information identifying an application associated with the service. The controller may determine that the application is associated with, for example, a server device providing a cloud-based service to a client device. The controller may divide the plurality of functions into a first group of functions associated with traffic transmitted by the client device to the server device (e.g., in a direction from client-to-server) and a second group of functions associated with traffic transmitted by the server device to the client device (e.g., in a direction from server-to-client).

In some implementations, the one or more factors include a quantity of nodes included in the controlled network. In some implementations, the controller divides the plurality of functions based on a minimum quantity of nodes through which traffic must pass to traverse the controlled network. The controller may determine a shortest path (e.g., least number of hops) through the controlled network. The controller may divide the plurality of functions such that traffic transmitted via the shortest path can be processed according to the plurality of functions. As an example, the controller may determine that the shortest path includes two nodes, an ingress node and an egress node (e.g., the traffic does not pass through an intermediary node). The controller may divide the plurality of functions into two groups of functions based on the shortest path including the two nodes.

Certain factors have been identified above that may be used by the controller to determine how to divide the plurality of functions into the two or more subsets of functions. In practice, the one or more factors, used by the controller, may include any single factor identified above, any combination of factors identified above, or one or more factors that are not identified above.

In some implementations, the controller generates a set of labels associated with the distributed node state machine. A label may be associated with a state and/or state transition of the distributed node state machine and may include information identifying a state of the distributed node state machine, information identifying the state transition, information identifying a function associated with the state and/or the state transition, and/or the like, as described in greater detail below.

In some implementations, the controller defines a label switched path (LSP) based on dividing the plurality of functions. The controlled network may include a multi-protocol label switching (MPLS) network. The controller may determine an LSP for each state of the distributed node state machine.

In some implementations, the distributed node state machine includes two or more function state machines. For example, the distributed node state machine may include a first function state machine and a second function state machine associated with traffic in the controlled network. The first function state machine and the second function state machine may be assigned to traffic to be transmitted on one or more LSPs. For example, the first function state machine may be associated with traffic traveling in a forward direction on an LSP and the second function state machine may be associated with traffic traveling in a reverse direction on the same LSP or a different LSP. The forward direction may refer to a first direction, such as a direction of traffic that enters the controlled network via an ingress node and exits the controlled network via an egress node. The reverse direction may refer to a second direction that is opposite the first direction, such as a direction of traffic that enters the controlled network via the egress node and/or exits the controlled network via the ingress node.

In some implementations, the controller assigns the function state machines to nodes in the controlled network. For example, the controller identifies the nodes to which to assign the function state machines based on one or more attributes of the nodes, such as a capability of the nodes, an availability of the nodes, a location of the nodes within the controlled network, and/or the like. The capability of a node may identify an amount of computing resources that the node contains (e.g., an amount or speed of processing resources, an amount and type of memory resources, and/or the like), one or more types of functions that the node is capable of performing (e.g., the node may be capable of performing a caching function, the node may not be capable of performing a security function, and/or the like), a maximum quantity of functions that the node is capable of performing (e.g., without impacting other operations of the node), and/or the like. The availability of the node may identify a predicted load on the node during normal operation of the controlled network, a status of the node (e.g., currently online or offline, a scheduled online or offline period, and/or the like), and/or the like. The location of the node may identify how the node is connected to one or more other nodes by links in the controlled network, where the node is located within the controlled network (e.g., whether the node is an ingress node, an egress node, or an intermediary node), and/or the like.

In some implementations, the controller may perform the operation of dividing the plurality of functions to generate the two or more function state machines concurrently with the operation of assigning the two or more function state machines to the nodes. In other words, the controller may perform these two operations together as a single, combined operation.

Assume for the example below, that the controlled network includes an ingress node connected to an intermediary node which is connected to an egress node. The controller may generate a first function state machine associated with the ingress node and a second function state machine associated with the egress node (e.g., with no function state machine being associated with the intermediary node). Alternatively, the controller may generate a first function state machine associated with the ingress node, a second function state machine associated with the intermediary node, and a third function state machine associated with the egress node.

The first function state machine may include information identifying the plurality of states, information identifying the first function, information indicating that a packet is to be processed according to the first function when the distributed node state machine is in the first state, and information identifying criteria for transitioning the distributed node state model from one state to another state (e.g., a state transition). The second function state machine may include information identifying the plurality of states, information identifying the second function, information indicating that a packet is to be processed according to the second function when the distributed node state machine is in the second state, and information identifying the state transitions. The third function state machine may include information identifying the plurality of states, information identifying the third function, information indicating that a packet is to be processed according to the third function when the distributed node state machine is in the third state, and information identifying the state transitions.

Figure 1C:
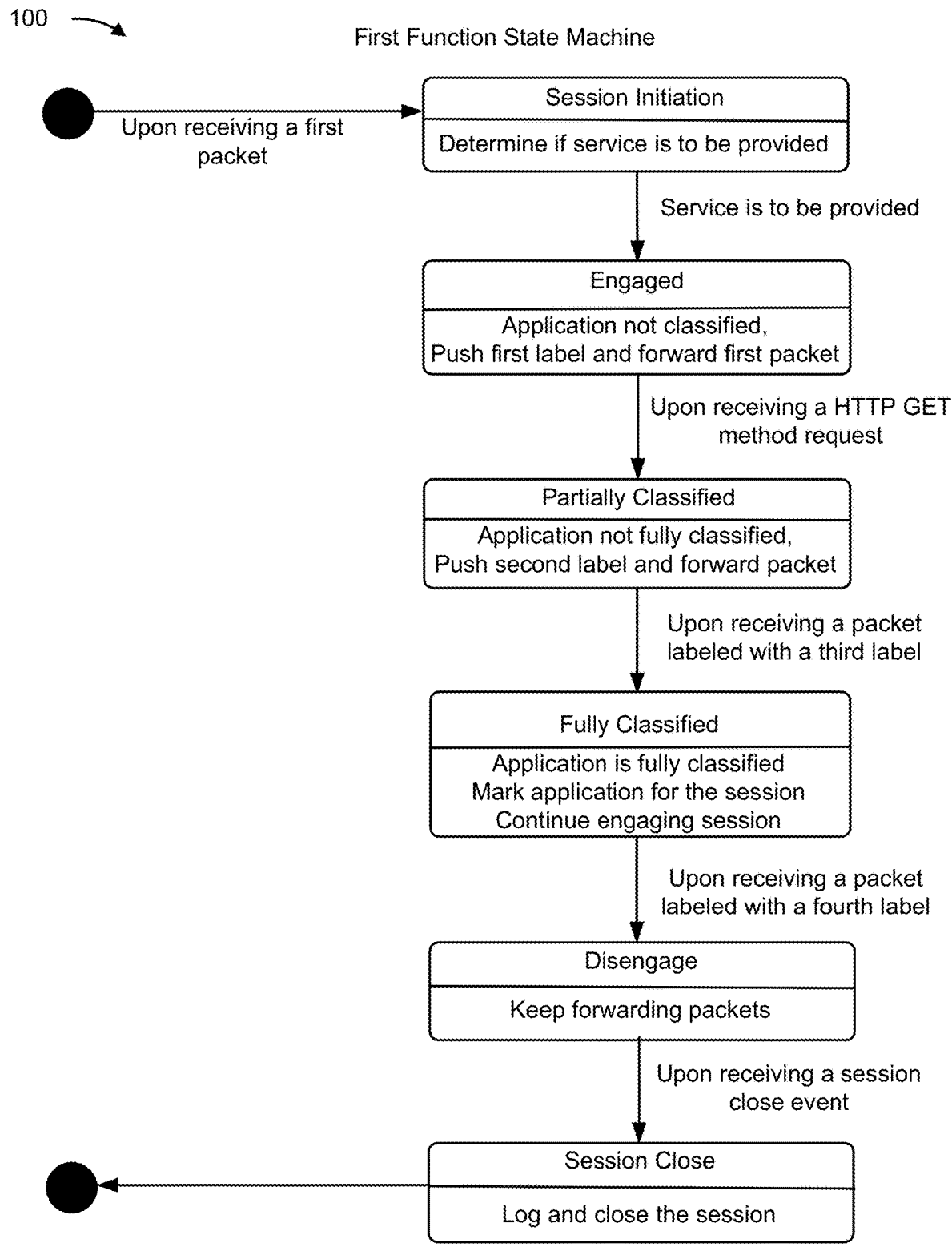

FIG. 1C is a diagram of an example of a first function state machine generated for a node associated with performing a first set of functions. The first function state machine may include a plurality of states and a plurality of state transitions. As shown in FIG. 1C, prior to receiving a first packet, the first function state machine is in a first, or idle, state (indicated by a dot in FIG. 1C).

A first state transition may cause the first function state machine to transition from the idle state to a session initiated state. As shown in FIG. 1C, the first state transition corresponds to receiving a first packet. The first packet may be received from a device external to the controlled network. The node may be an ingress node and may determine that the first packet is traveling in the forward direction based on the first packet being received by the ingress node from the device external to the controlled network. The session initiated state may be associated with a function that includes one or more tasks to be performed based on the first function state machine being in the session initiated state and the first packet being transmitted in the forward direction. As shown in FIG. 1C, the session initiated state is associated with determining if the service is to be provided (e.g., for a communication session associated with the first packet).

A second state transition may cause the first function state machine to transition from the session initiation state to an engaged state. As shown in FIG. 1C, the second state transition corresponds to a determination that the service is to be provided. The engaged state may be associated with a forward direction function that includes one or more forward direction tasks to be performed on traffic travelling in the forward direction based on the first function state machine being in the engaged state. As shown in FIG. 1C, the one or more forward direction tasks include determining that an application associated with the first packet is not classified, pushing a first label on to the first packet, and forwarding the first packet to a node in the controlled network indicated by the first label.

In some implementations, the engaged state is associated with a reverse direction function that includes one or more reverse direction tasks to be performed on traffic traveling in the reverse direction that is associated with a communication session associated with the first packet based on the first function state machine being in the engaged state. The one or more reverse direction tasks may include determining that a packet includes a label having a label identifier associated with traffic traveling in the reverse direction, removing the label from the traffic, and forwarding the traffic towards a destination identified by the label.

A third state transition may cause the first function state machine to transition from the engaged state to a partially classified state. As shown in FIG. 1C, the third state transition corresponds to receiving an HTTP GET method request. The partially classified state may be associated with a forward direction function that includes one or more forward direction tasks to be performed on traffic traveling in the forward direction based on the first function state machine being in the partially classified state. As shown in FIG. 1C, the one or more forward direction tasks include determining that the application is not fully classified, pushing a second label on to the HTTP GET method request, and forwarding the HTTP GET method request to a node in the controlled network indicated by the second label.

The partially classified state may be associated with a reverse direction function that includes one or more reverse direction tasks to be performed on traffic traveling in the reverse direction based on the first function state machine being in the partially classified state. The one or more reverse direction tasks may include receiving a packet traveling in the reverse direction, removing the label from the packet, and forwarding the packet towards a destination identified by the label.

A fourth state transition may cause the first function state machine to transition from the partially classified state to a fully classified state. As shown in FIG. 1C, the fourth state transition corresponds to receiving a packet labeled with a third label. The fully classified state may be associated with a function that includes one or more tasks to be performed on traffic based on the first function state machine being in the fully classified state. As shown in FIG. 1C, the one or more tasks include determining that the application is fully classified, marking the application for the communication session as fully classified, and continuing to engage the communication session.

A fifth state transition may cause the first function state machine to transition from the fully classified state to a disengage state. As shown in FIG. 1C, the fifth state transition corresponds to receiving a packet labeled with a fourth label. The fourth label may include information indicating that another node will perform the processing of traffic for the communication session. The disengaged state may be associated with a function that includes one or more tasks to be performed on traffic based on the first function state machine being in the disengaged state. As shown in FIG. 1C, the one or more tasks include keep forwarding packets. The one or more tasks may also include pushing a fifth label on to packets traveling in the forward direction, forwarding the packets traveling in the forward direction to a device identified by the fifth label, removing a label from packets traveling in the reverse direction, routing the packets traveling in the reverse direction to a device identified by the removed label, and/or the like.

A sixth state transition may cause the first function state machine to transition from the disengage state to the session close state. As shown in FIG. 1C, the sixth state transition corresponds to receiving a session close event. The session close event may include a message indicating that the communication session is to be terminated. The session close state may be associated with a function that includes one or more tasks to be performed on traffic based on the first function state machine being in the session close state. As shown in FIG. 1C, the one or more tasks include logging and closing the session. In some implementations, the first function state machine may transition from the session close state to the idle state based on logging and closing the session.

Figure 1D:
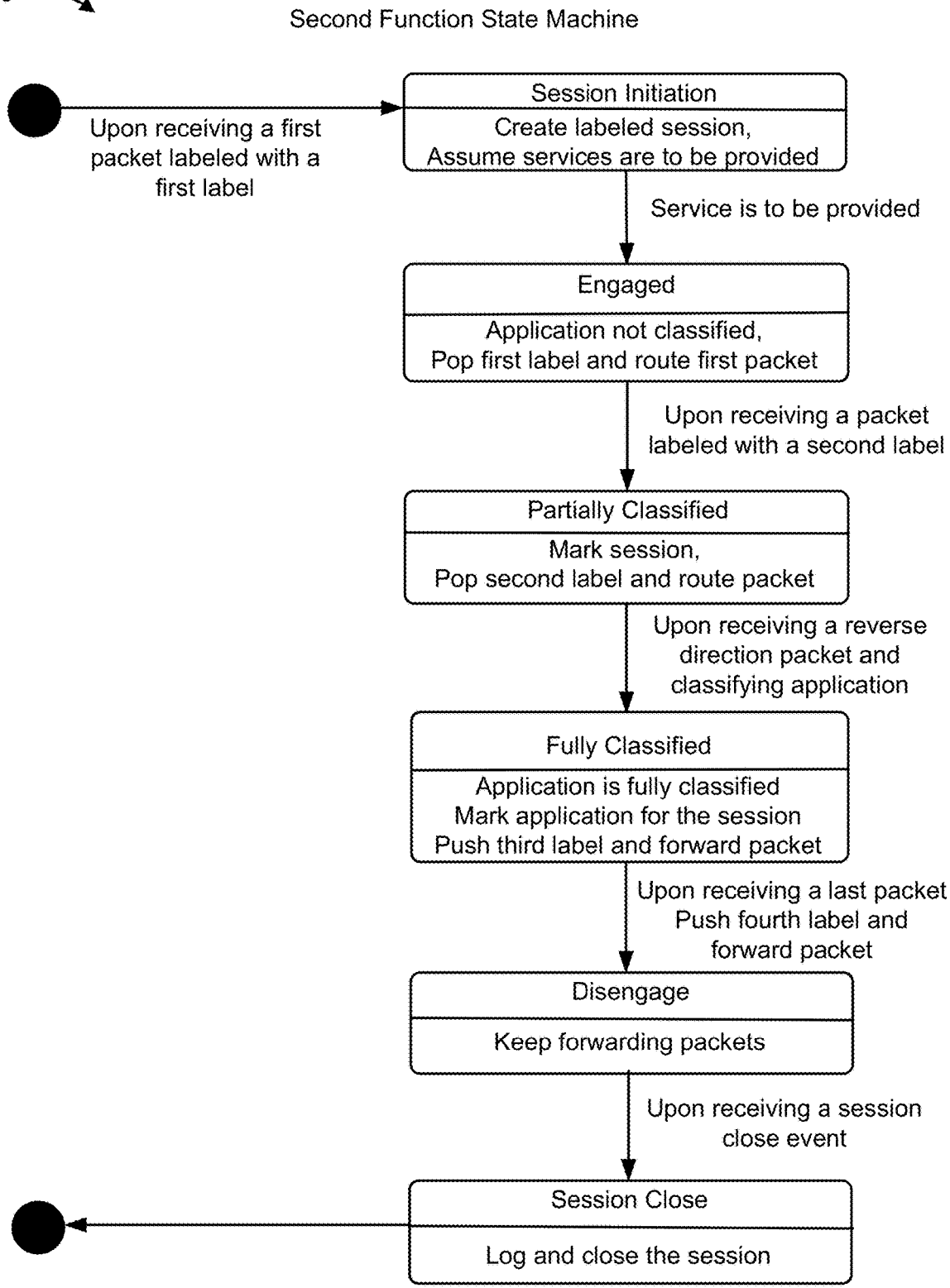

FIG. 1D is a diagram of an example of a second function state machine generated for a node associated with performing a second set of functions. The second function state machine may include a plurality of states and a plurality of state transitions. In some implementations, the plurality of states and/or the plurality of state transitions correspond to the plurality of states and/or the plurality of transitions included in the first function state machine. As shown in FIG. 1D, prior to receiving a first packet, the second function state machine is in a first, or idle, state (indicated by a dot in FIG. 1D).

A first state transition may cause the second function state machine to transition from the idle state to a session initiated state. As shown in FIG. 1D, the first state transition corresponds to receiving a first packet labeled with the first label. The session initiated state may be associated with a function that includes one or more tasks to be performed based on the second function state machine being in the session initiated state. As shown in FIG. 1D, the one or more tasks include creating a labeled session (e.g., a communication session associated with the packet) and assuming services are to be provided.

A second state transition may cause the second function state machine to transition from the session initiation state to an engaged state. As shown in FIG. 1D, the second state transition corresponds to a determination that service is to be provided. The engaged state may be associated with an forward direction function that includes one or more forward direction tasks to be performed on traffic traveling in the forward direction based on the second function state machine being in the engaged state. The node may be an egress node and may determine that the first packet is traveling in the forward direction based on receiving the first packet from a node included in the controlled network. As shown in FIG. 1D, the one or more forward direction tasks include determining that an application associated with the first packet is not classified, popping the first label off the first packet, and routing the first packet to a node indicated by the first label.

In some implementations, the engaged state is associated with a reverse direction function that includes one or more reverse direction tasks to be performed on traffic traveling in the reverse direction based on the second function state machine being in the engaged state. The one or more reverse direction tasks may include receiving a packet that does not include a label, pushing a label onto the packet, and forwarding the traffic towards a node in the controlled network identified by the label.

A third state transition may cause the second function state machine to transition from the engaged state to a partially classified state. As shown in FIG. 1D, the third state transition corresponds to receiving a packet labeled with a second label. The partially classified state may be associated with a forward direction function that includes one or more forward direction tasks to be performed on traffic traveling in the forward direction based on the second function state machine being in the partially classified state. As shown in FIG. 1D, the one or more forward direction tasks include marking the packet as partially classified, popping the second label off the packet, and routing the packet to a device indicated by the second label.

The partially classified state may be associated with a downstream function that includes one or more reverse direction tasks to be performed on traffic traveling in the reverse direction based on the second function state machine being in the partially classified state. The one or more reverse direction tasks may include receiving a packet that does not include a label, pushing a label onto the packet, and forwarding the traffic towards a node in the controlled network identified by the label.

A fourth state transition may cause the second function state machine to transition from the partially classified state to a fully classified state. As shown in FIG. 1D, the fourth state transition corresponds to receiving a packet traveling in the reverse direction and classifying the application. The fully classified state may be associated with a function that includes one or more reverse direction tasks to be performed on traffic traveling in the reverse direction based on the second function state machine being in the fully classified state. As shown in FIG. 1D, the one or more reverse direction tasks include determining that the application is fully classified, marking the application for the communication session as fully classified, pushing a third label onto the packet, and forwarding the packet to a node indicated by the third label.

A fifth state transition may cause the second function state machine to transition from the fully classified state to a disengage state. As shown in FIG. 1D, the fifth state transition corresponds to receiving a last packet, pushing a fourth label on to the last packet, and forwarding the last packet to a node indicated by the fourth label. The disengaged state may be associated with a function that includes one or more tasks to be performed on traffic based on the first function state machine being in the disengaged state. As shown in FIG. 1D, the one or more tasks include keep forwarding packets.

A sixth state transition may cause the second function state machine to transition from the disengage state to the session close state. As shown in FIG. 1D, the sixth state transition corresponds to receiving a session close event. The session close event may include a message indicating that the communication session is to be terminated. The session close state may be associated with a function that includes one or more tasks to be performed on traffic based on the first function state machine being in the session close state. As shown in FIG. 1D, the one or more tasks include logging and closing the session. In some implementations, the second function state machine may transition from the session close state to the idle state based on logging and closing the session.

The first function state machine and/or the second function state machine may include additional states and state transitions associated with performing upstream processing and/or downstream processing for providing the service.

Figure 1E:
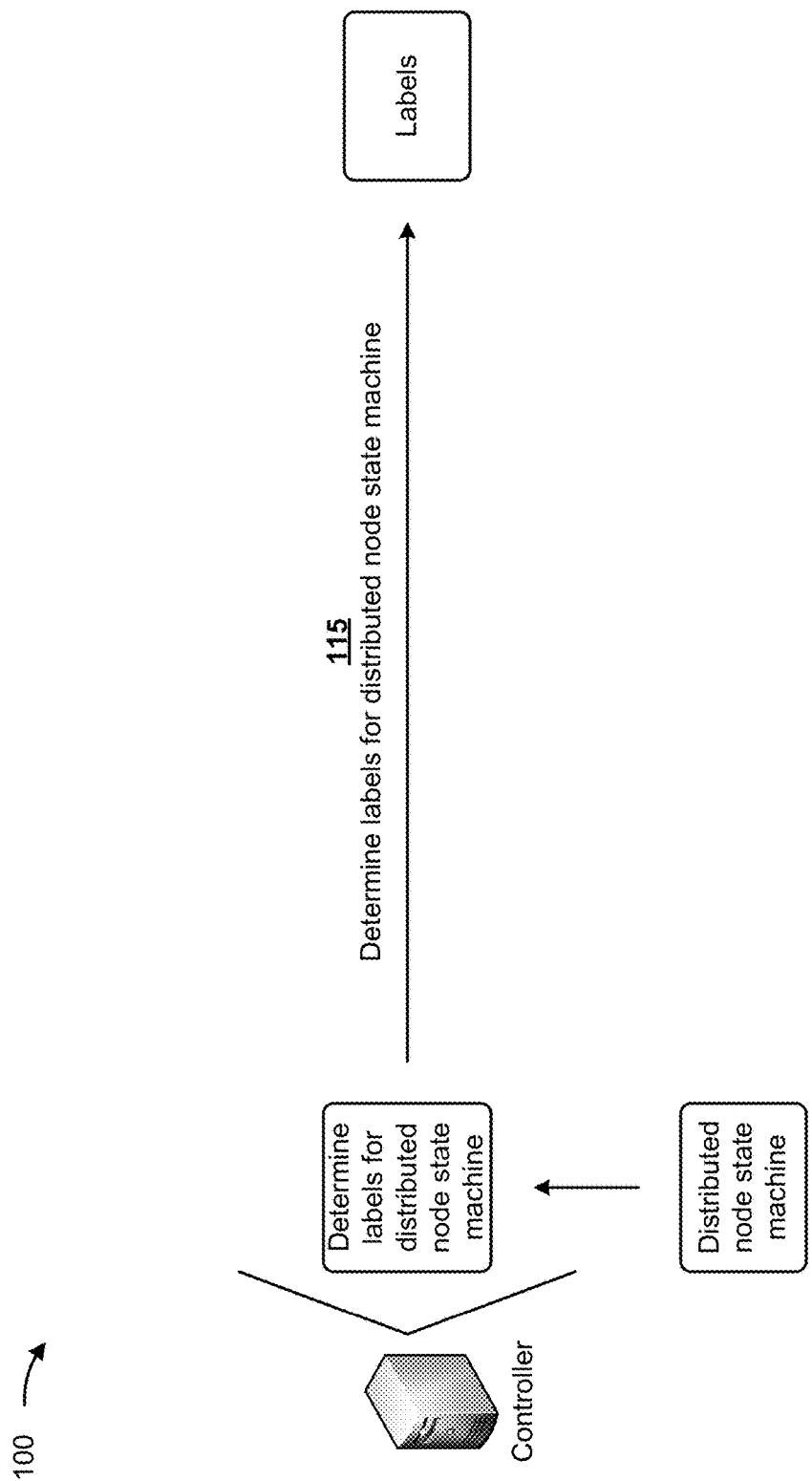

As shown in FIG. 1E, and by reference number 115, the controller determines labels for the distributed node state machine. The controller may identify each state and/or state transition of the distributed node state machine. The controller may generate and/or assign a label to each identified state and/or state transition. The label may include information identifying the state and/or the state transition to which the label is assigned, information identifying a function and/or a task associated with the state and/or the state transition, and/or information identifying a node to which a packet is to be forwarded.

In some implementations, the controller determines a set of labels for each function state machine associated with the distributed node state machine. For example, the controller may determine a first set of labels for the first function state machine and a second set of labels for the second function state machine.

Figure 1F:
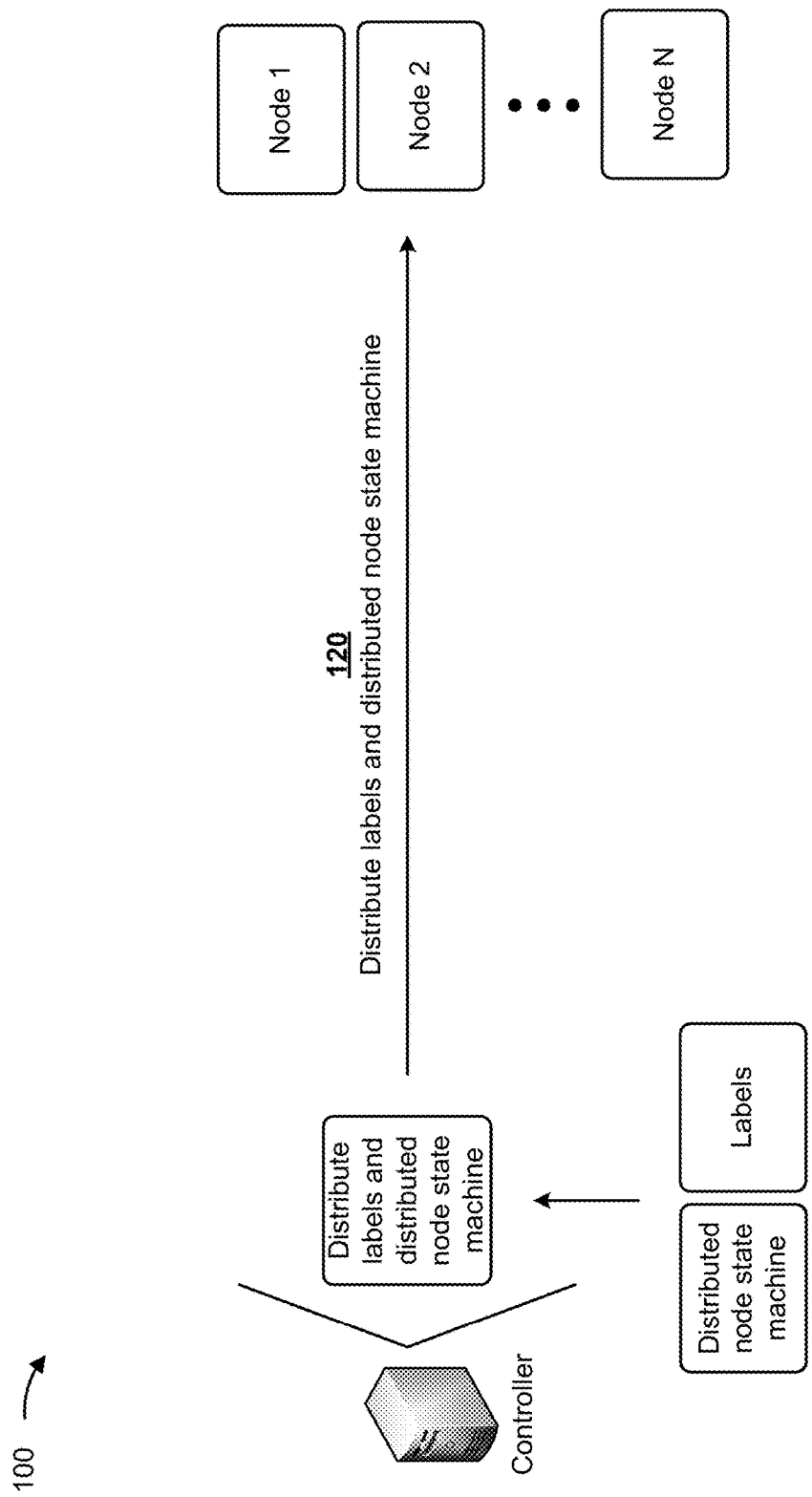
Figure 1G:
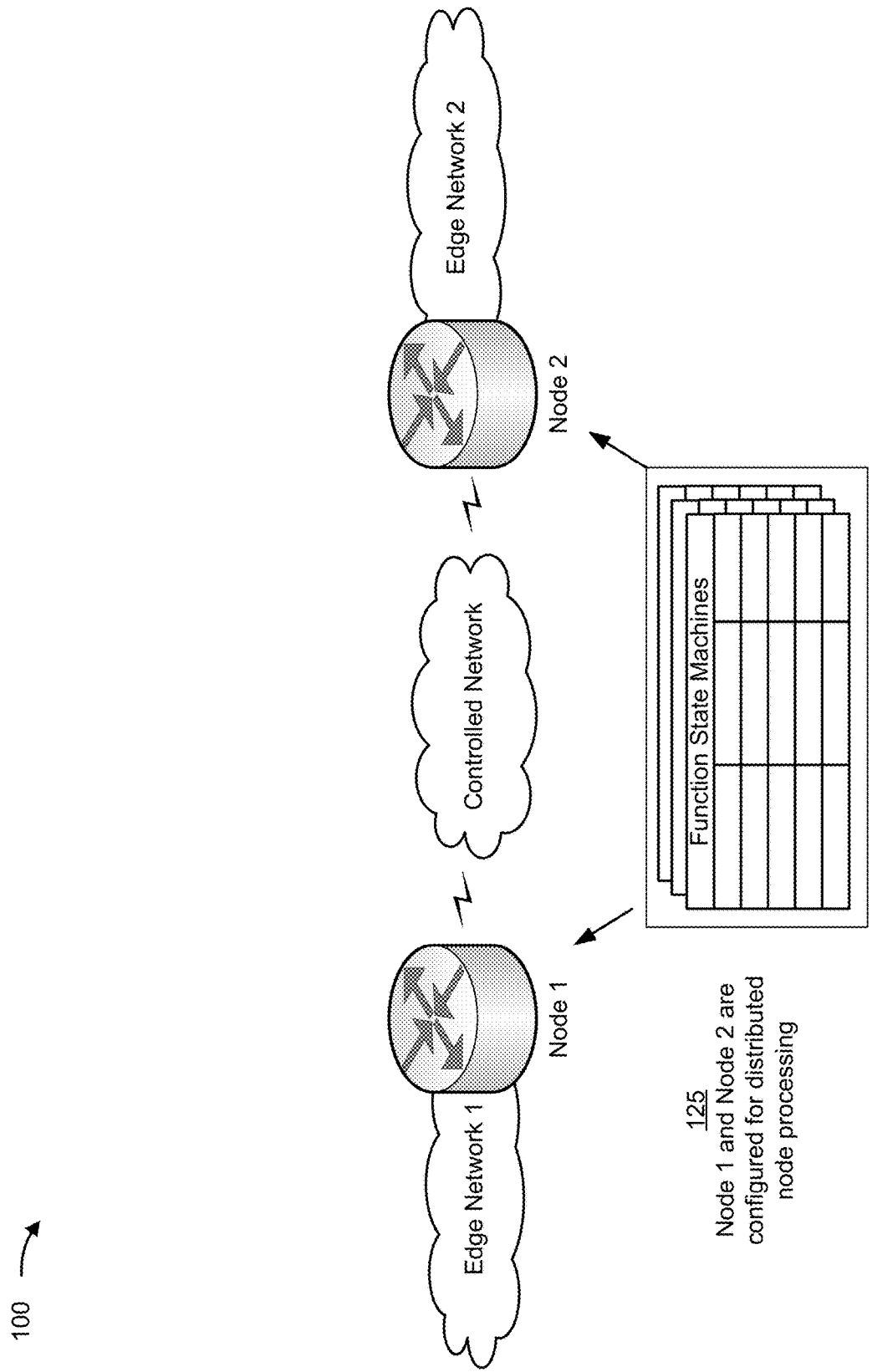

As shown in FIG. 1F, and by reference number 120, the controller distributes the distributed node state machine and the labels to nodes included in the controlled network. In some implementations, the controller determines nodes for performing different functions in the distributed node state machine and distributes the distributed node state machine and the labels to the identified nodes. For example, the controller may determine that the node 1 is to perform processing for the service for traffic traveling in the forward direction and that the node 2 is to perform processing for the service for traffic traveling in the reverse direction. The controller may distribute the distributed node state machine and the labels to the node 1 based on the node 1 performing the processing for the service for traffic traveling in the forward direction. The controller may distribute the distributed node state machine and the labels to the node 2 based on the node 2 performing the processing for the service for the traffic traveling in the reverse direction.

In some implementations, the controller distributes the distributed node state machine by providing an address associated with the distributed node state machine. The controller may store the distributed node state machine in a data structure (e.g., a database, a table, a list, and/or the like) stored in a memory associated with the controller. The controller may provide nodes included in the controlled network with information for accessing the distributed node state machine (e.g., a link to the distributed node state machine, a memory address, and/or the like).

As shown in FIG. 1G, and by reference number 125, the nodes (e.g., the node 1 and the node 2, as shown in FIG. 1G) are configured for distributed node processing. The nodes may be configured for distributed node processing based on receiving the distributed node state machine, the information for accessing the distributed node state machine, and/or the labels and storing the distributed node state machine and/or the labels in a memory associated with the nodes.

In some implementations, the node 1 and/or the node 2 may store the distributed node state machine and/or the labels in a memory associated with the node 1 and/or the node 2, respectively. For example, the node 1 may receive the first function state machine and the labels from the controller. The node 1 may store the first function state machine and the labels in a memory of the node 1. The node 2 may receive the second function state machine and the labels from the controller. The node 2 may store the second function state machine and the labels in a memory of the node 2.

Figure 1H:
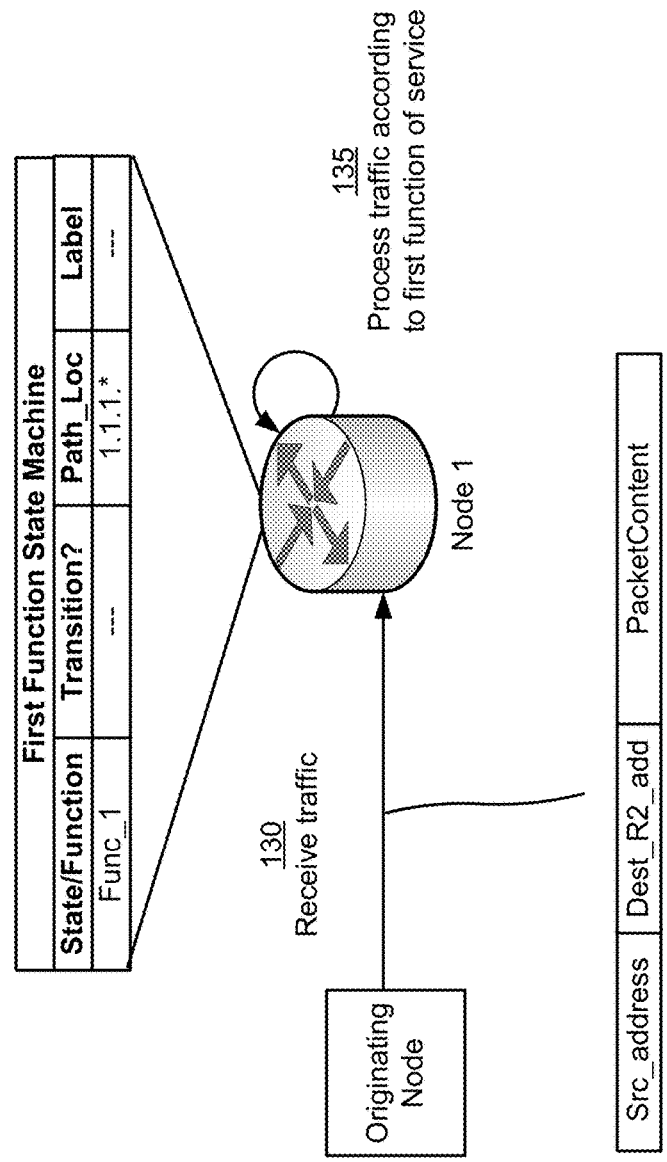

As shown in FIG. 1H, and by reference number 130, the node 1 may receive traffic from an originating node. In some implementations, the node 1 may be an ingress node (e.g., a provider edge router) positioned at an edge of the controlled network. The originating node may be a client device (e.g., a computer, a smart phone, a tablet, and/or the like), a network device (e.g., a customer edge device, a router, a switch, and/or the like), and/or the like that transmits traffic to the node 1 to access a service, another network, and/or the like via the controlled network.

In some implementations, the node 1 determines that the traffic is to be processed using the distributed node state machine. The node 1 may identify a service associated with the traffic. In some implementations, the node 1 determines a tuple, such as a 5-tuple, based on the traffic. For example, the node 1 may determine the tuple based on a source address associated with the traffic, a source port identifier associated with the traffic, a destination address associated with the traffic, a destination port identifier associated with the traffic, and a protocol associated with the traffic. The node 1 may utilize the tuple to determine a service associated with the traffic. For example, the node 1 may access a data structure storing information associating one or more portions of the tuple with services. The node 1 may determine that the traffic is associated with a service based on one or more portions of the tuple being associated with the service in the data structure.

In some implementations, the node 1 may determine a state associated with the distributed node state machine based on determining that the traffic is to be processed using the distributed node state machine. The node 1 may determine that the distributed node state machine is in an idle state based on the traffic. In some implementations, the node 1 may determine that the distributed node state machine is in the idle state based on an application associated with the traffic not being classified. The node 1 may determine an application associated with the traffic. In some implementations, the node 1 may determine the application associated with the traffic based on an application identifier included in a header of a first packet received by the node 1. The node 1 may query a data structure that stores information associated with classifying applications associated with received traffic and may determine that the application associated with the traffic is not classified based on the application identifier.

In some implementations, the node 1 determines that the distributed node state machine is in the idle state based on a communication session associated with the traffic not be established. The node 1 may determine a source address and/or a destination address associated with the traffic. The node 1 may determine that a communication session has not been established for the traffic based on the source address and/or the destination address.

In some implementations, the node 1 determines that the distributed node state machine is in the idle state based on the traffic including an initial protocol data unit or a request to establish a connection with a device associated with the controlled network. For example, the node 1 may determine that the distributed node state machine is in the idle state based on the traffic including a synchronization (SYN) message. The originating node may transmit a SYN message to establish a transmission control protocol (TCP) connection with a server device via the controlled network.

As shown by reference number 135, the node 1 processes the traffic according to a first function of the service. The first function of the service may include one or more tasks. The one or more tasks may include determining whether the service is to be provided to the traffic, determining a label associated with the session initiation state, determining a label associated with a state transition, and/or the like. The node 1 may perform the one or more tasks to process the traffic according to the first function of the service.

In some implementations, the one or more functions includes determining whether the traffic is initiation traffic. The initiation traffic may include traffic for establishing a communication session with a device via the controlled network. The node 1 may determine that the traffic is initiation traffic based on the traffic not including a label associated with the distributed node state machine, the traffic including the initial protocol data unit, the traffic including the request message, and/or the like.

Figure 1I:
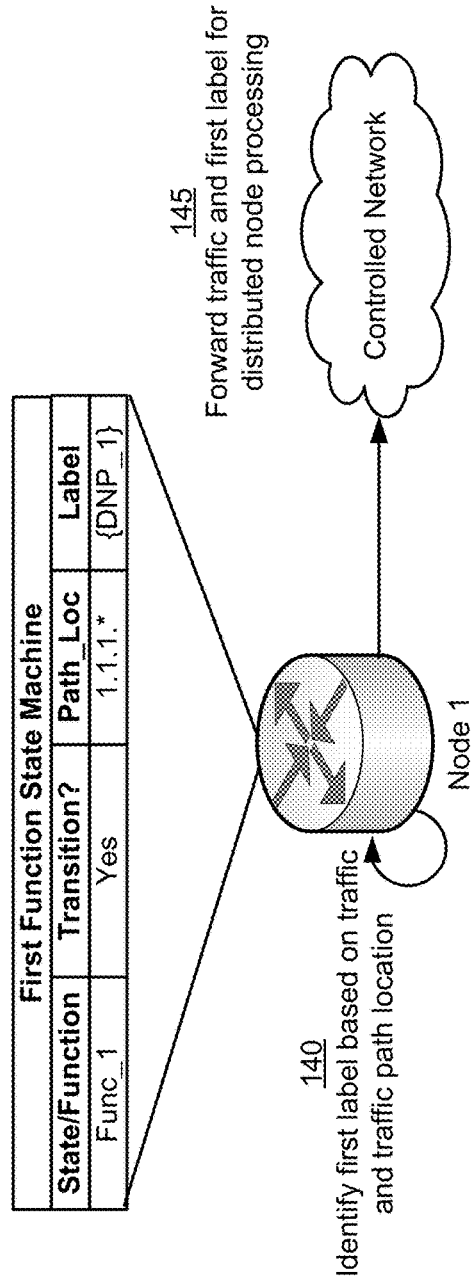

As shown in FIG. 1I, and by reference number 140, the node 1 identifies a first label based on the traffic and a traffic path location. In some implementations, the node 1 identifies the first label based on the traffic being initiation traffic and/or based on the node 1 being an ingress node in the controlled network. The node 1 may identify a label, from the labels received from the controller, that is associated with the initiation traffic received at an ingress node based on the distributed node state machine. The node 1 may identify the label as the first label based on the label being associated with the initiation traffic received at the ingress node.

In some implementations, the node 1 determines a state transition associated with the idle state. In some implementations, the state transition corresponds to receiving a first packet. The node 1 may determine that the traffic includes a first packet based on the traffic being associated with an application that has not been classified and/or that a communication session has not been established for the traffic. The node 1 may determine that receiving the traffic corresponds to the state transition associated with the idle state based on the traffic including the first packet.

In some implementations, the node 1 causes the distributed node state machine to transition from the idle state to a first state based on receiving the traffic corresponding to the state transition. For example, the node 1 may cause the distributed node state machine to transition from the idle state to a session initiation state based on receiving the traffic corresponding to the state transition. The node 1 may determine a function associated with the session initiation state.

In some implementations, the node 1 determines a node in the controlled network to which the traffic is to be forwarded based on the first label. In some implementations, the first label includes information identifying the node to which the traffic is to be forwarded. The node 1 determines the node to which the traffic is to be forwarded based on the information included in the label. As shown by reference number 145, the node 1 forwards the traffic and the first label for distributed node processing. For example, the node 1 forwards the traffic and the first label to the node identified in the first label (e.g., the node 2, as shown in FIG. 1J).

Figure 1J:
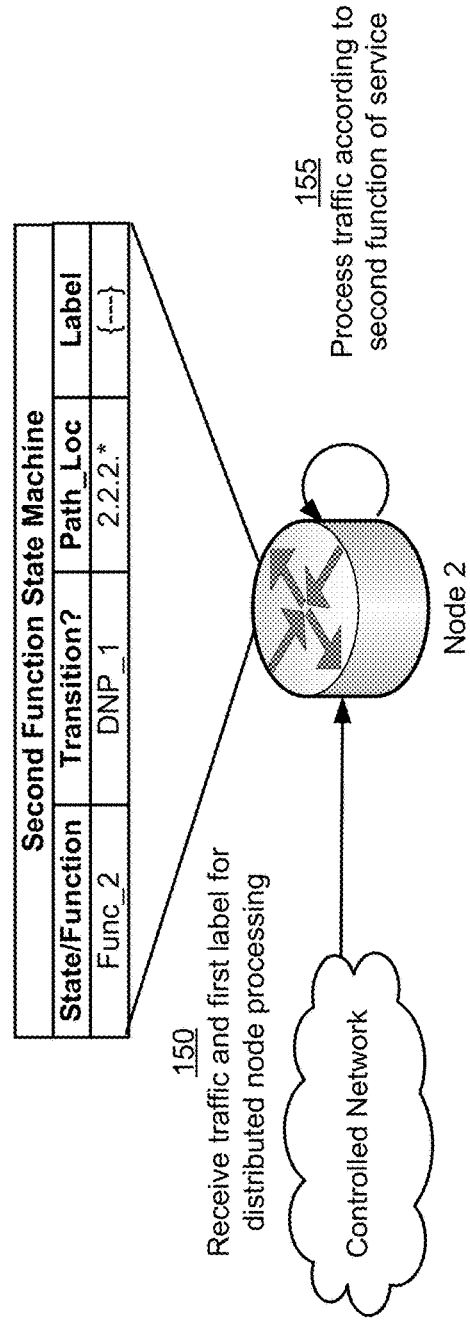

As shown in FIG. 1J, and by reference number 150, the node 2 receives the traffic and the first label for distributed node processing. The first label may include information indicating that the distributed node state machine has transitioned from the idle state to the session initiation state. In some implementations, the first label includes a label identifier. The node 2 may determine that the label identifier is associated with the session initiation state. The node 2 may determine that the distributed node state machine has transitioned to the session initiation state based on the label identifier being associated with the session initiation state.

The node 2 may determine a second function associated with the session initiation state. In some implementations, the node 2 determines the second function associated with the session initiation state in a manner similar to that described above with respect to FIG. 1H.

As shown by reference number 155, the node 2 processes the traffic according to the second function. The second function may include establishing the communication session for the traffic, performing a security function on the traffic (e.g., a deep packet inspection, NAT, IDP, and/or the like), removing the first label from the traffic, routing the traffic toward a destination device, and/or the like.

Figure 1K:
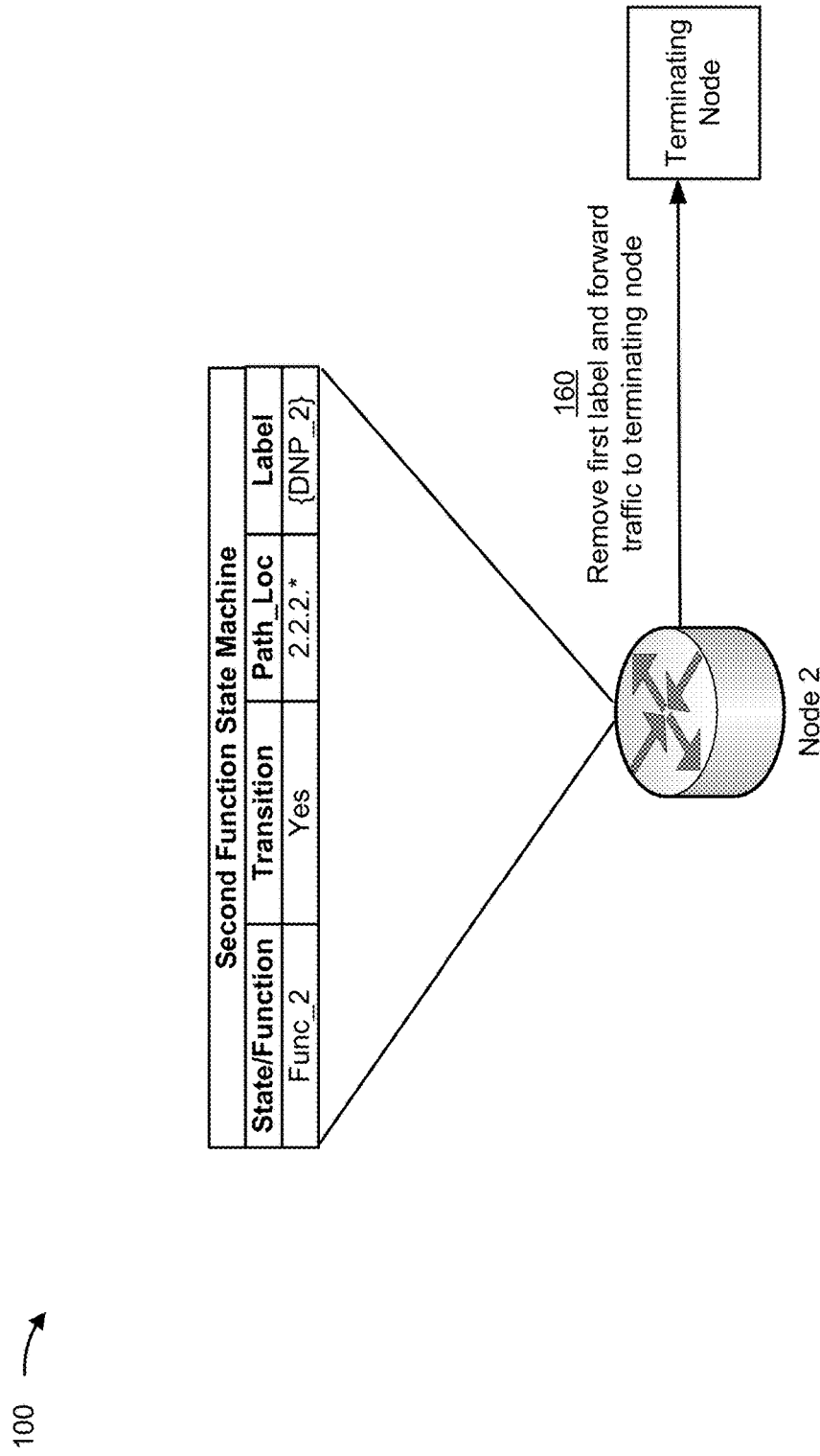

As shown in FIG. 1K, and by reference number 160, the node 2 removes the first label and forwards the traffic toward a terminating node. In some implementations, the first label includes information identifying the terminating node. The node 2 may forward the traffic to the terminating node based on the first label including the information identifying the terminating node. The terminating node may be a client device, a network device, and/or the like located outside of the controlled network.

Figure 1L:
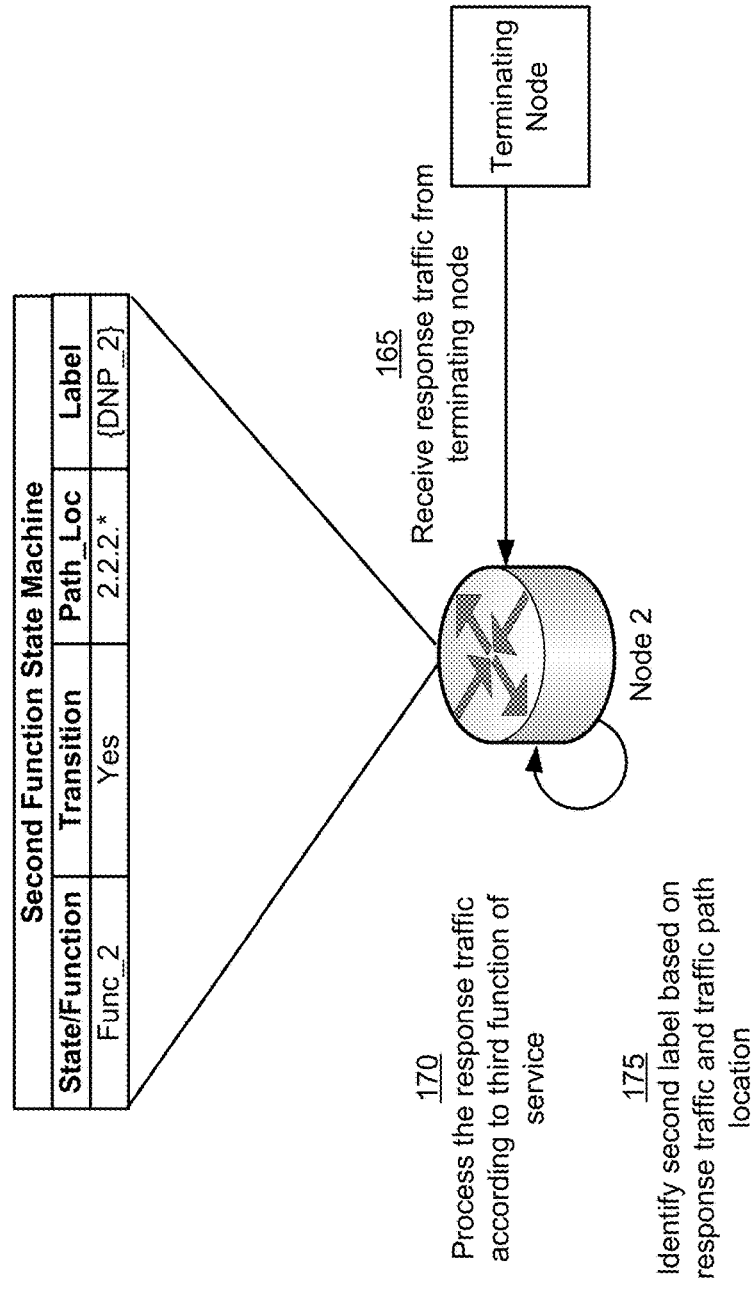

In some implementations, the node 2 receives response, reverse direction, or downstream traffic (e.g., traffic traveling in the reverse direction) based on forwarding the traffic toward the terminating node. For example, as shown in FIG. 1L, the node 2 receives response traffic from the terminating node. The node 2 may analyze the traffic and may determine that the traffic is response traffic based on the analysis. In some implementations, the node 2 determines that the traffic is response traffic based on the traffic being associated with the communication session established with the session.

As an example, the node 2 may determine a source address, a destination address, and/or the like associated with the traffic received from the terminating node. The node 2 may determine that the source address, the destination address, and/or the like is associated with the communication session established for the traffic transmitted to the terminating node. The node 2 may determine that the traffic received from the terminating node is response traffic based on the source address, the destination address, and/or the like being associated with the communication session established for the traffic transmitted toward the terminating node.

In some implementations, the node 2 determines that the traffic received from the terminating node is response traffic based on the traffic received from the terminating node not including a label associated with the distributed node state machine. The node 2 may analyze the traffic received from the terminating node and may determine that the traffic received from the terminating node does not include a label associated with the distributed node state machine. The node 2 may determine that the traffic received from the terminating node is response traffic based on the traffic not including the label.

In some implementations, the node 2 determines that the traffic received from the terminating node is response traffic based on receiving the traffic from a device not included in the controlled network and/or based on a path location associated with the node 2. The node 2 may determine that the traffic is received from a device not included in the controlled network based on a port at which the traffic was received. For example, the node 2 may determine that the traffic is received from a device not included in the controlled network based on receiving the traffic at a port associated with receiving data from an external network.

As shown by reference number 170, the node 2 processes the response traffic according to a third function of service. The node 2 may determine that the response traffic is to be processed using the distributed node state machine. For example, the node 2 may determine that the response traffic is to be processed using the distributed node state machine based on a service associated with the response traffic, the response traffic being associated with the communication session, and/or the like. In some implementations, the node 2 determines the service associated with the response traffic in a manner similar to that described above with respect to FIG. 1H.

The node 2 may determine a state of the distributed node state machine (e.g., the second function state machine). In some implementations, the node 2 determines the state of the second function state machine in a manner similar to that described above. The node 2 may determine to process the response traffic according to the third function of service based on the state of the second function state machine.

The third function of service may include one or more tasks. The one or more tasks may include determining whether the response traffic is associated with a communication session, updating information associated with a communication session associated with the response traffic, performing processing associated with the service on the response traffic, and/or the like.

As shown in FIG. 1L, and by reference number 175, the node 2 identifies a second label based on the response traffic and the traffic path location. In some implementations, the node 2 determines the second label in a manner similar to that described above with respect to FIG. 1I.

Figure 1M:
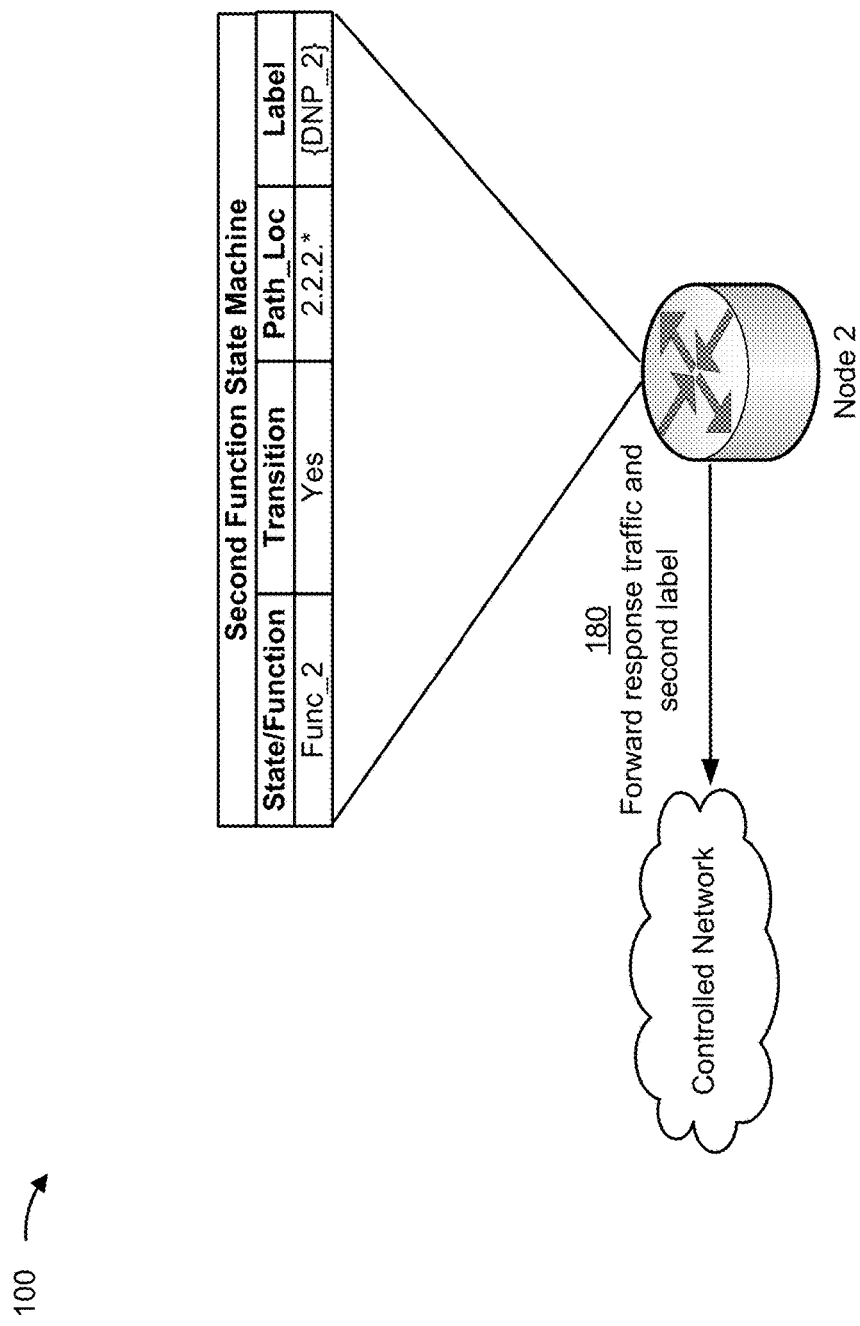

As shown in FIG. 1M, and by reference number 180, the node 2 forwards the response traffic and the second label. The second label may include information associated with the communication session (e.g., information indicating that the communication session is established, information indicating that an application associated with the communication is not classified, information indicating that the application is partially classified, information indicating that the application is fully classified, and/or the like), information indicating a current state of the distributed node state machine, information identifying a node to which the response traffic is to be forwarded, information identifying a destination address associated with the response traffic, and/or the like. In some implementations, the node 2 may forward the response traffic and the second label based on information included in the second label. For example, the node 2 may forward the response traffic to the node identified by the second label (e.g., the node 1).

Figure 1N:
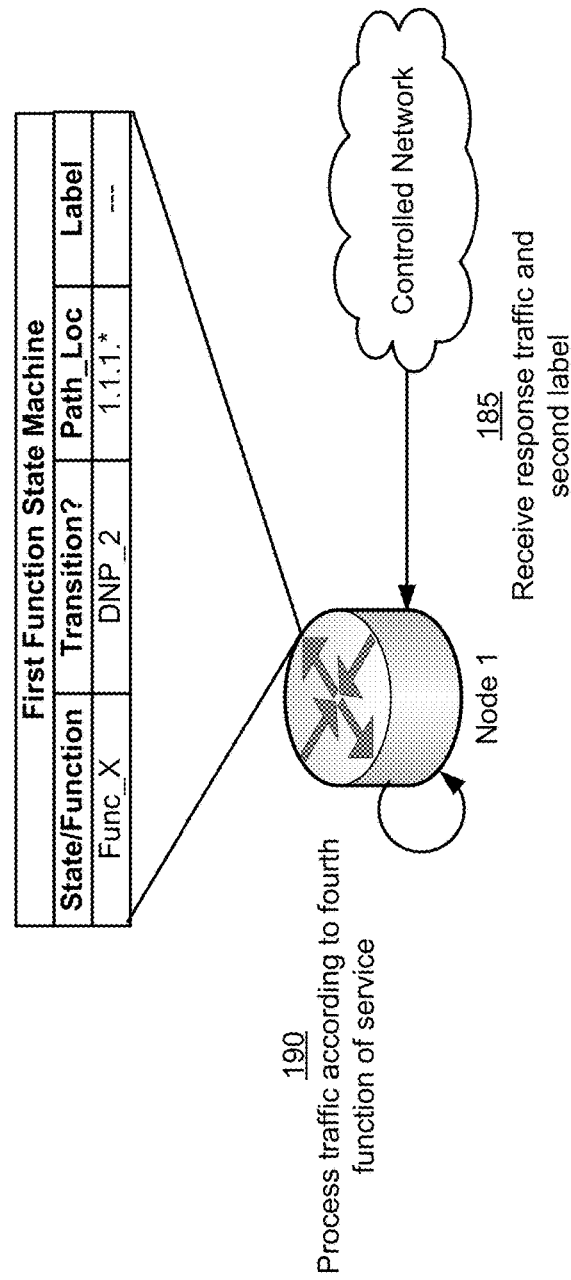
Figure 10:
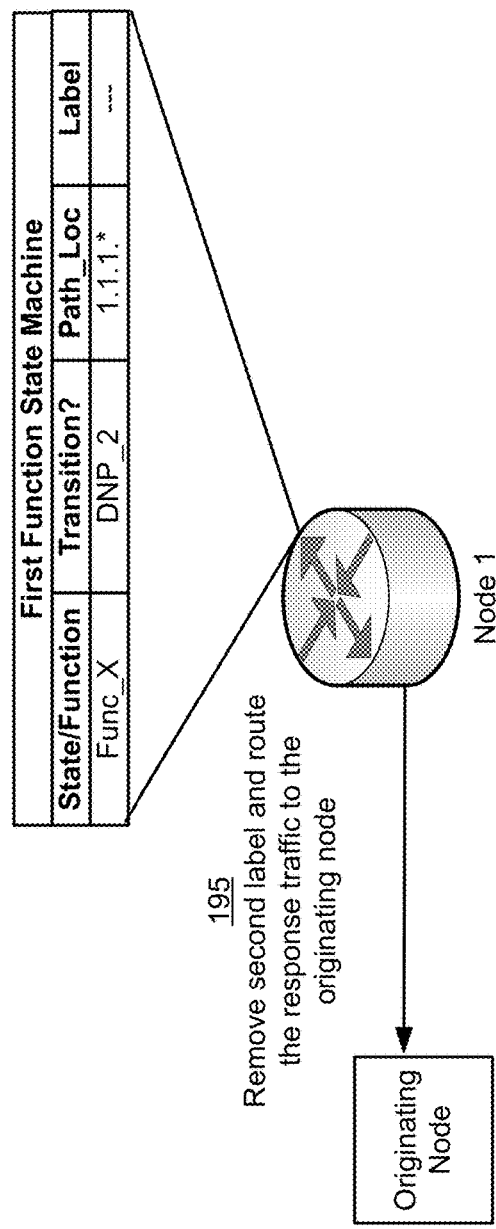

As shown in FIG. 1N, and by reference number 185, the node 1 receives the response traffic and the second label. The node 1 may determine a current state of the distributed node state machine based on the second label.

In some implementations, the node 1 determines a fourth function associated with the current state of the distributed node state machine (e.g., the first function state machine). As shown by reference number 190, the node 1 processes the response traffic according to the fourth function of the service. In some implementations, the fourth function includes removing the second label and forwarding the response traffic based on a destination address identified by the second label. As shown in FIG. 1O, and by reference number 195, the node 1 removes the second label and routes the response traffic toward the originating node.

As indicated above, FIGS. 1A-1O are provided as one or more examples. Other examples may differ from what is described with regard to FIGS. 1A-1O. The number and arrangement of devices shown in FIGS. 1A-1O are provided as an example. In practice, there may be additional devices, fewer devices, different devices, or differently arranged devices than those shown in FIGS. 1A-1O. Furthermore, two or more devices shown in FIGS. 1A-1O may be implemented within a single device, or a single device shown in FIGS. 1A-1O may be implemented as multiple, distributed devices. Additionally, or alternatively, a set of devices (e.g., one or more devices) shown in FIGS. 1A-1O may perform one or more functions described as being performed by another set of devices shown in FIGS. 1A-1O.

Figure 2:
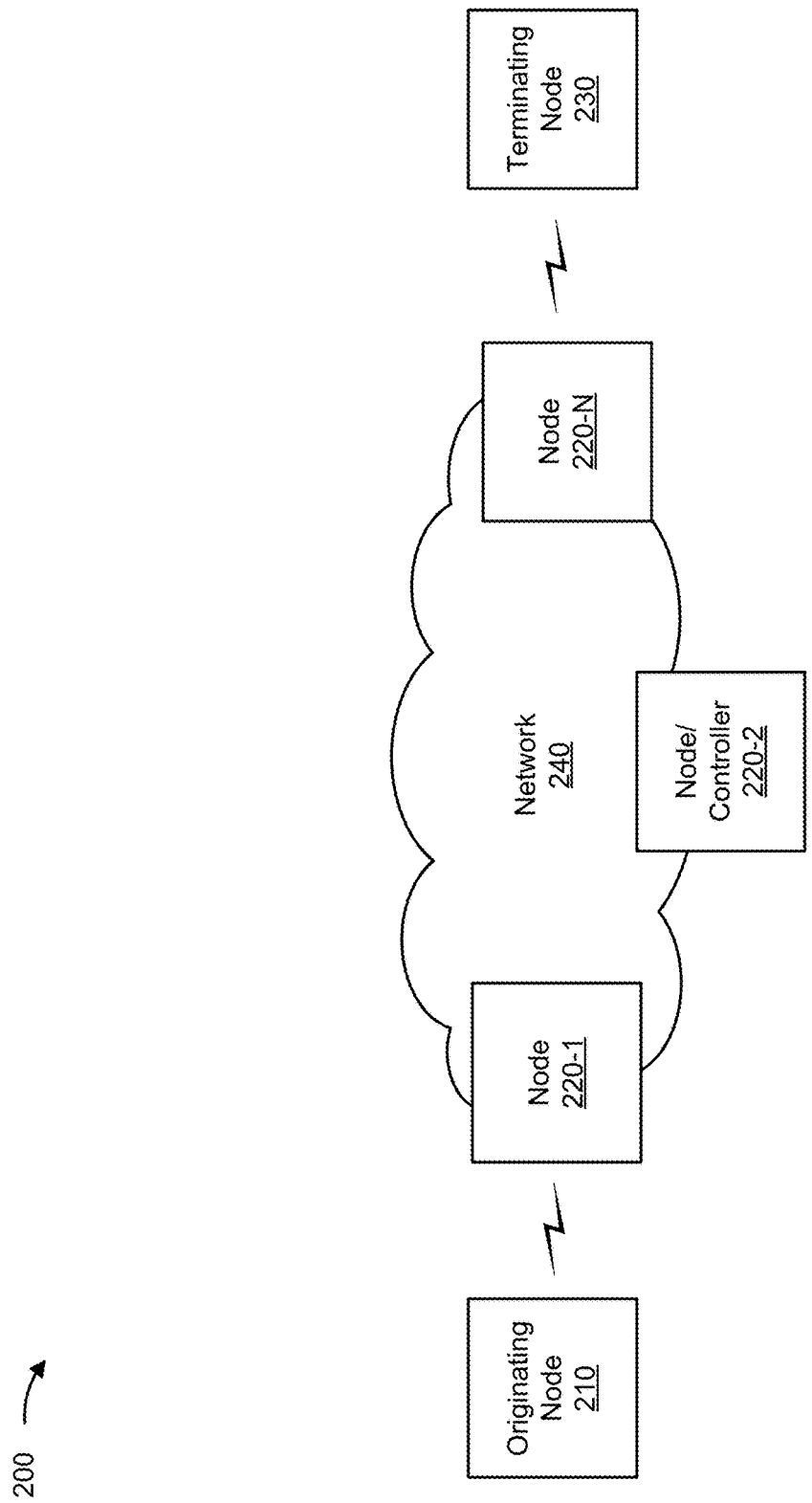
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include an originating node 210, a group of nodes 220 (shown as node 220-1 through network device 220-N), a terminating node 230, and a network 240. Devices of environment 200 may interconnect via wired connections, wireless connections, or a combination of wired and wireless connections.

Originating node 210 includes one or more devices capable of receiving, generating, storing, processing, and/or providing information, such as information described herein. For example, originating node 210 may include a node 220, a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, and/or the like. In some implementations, originating node 210 may receive network traffic from and/or may provide network traffic to another originating node 210 and/or terminating node 230 via network 240 (e.g., by routing packets using nodes 220 as intermediaries).

Node 220 includes one or more network devices capable of receiving, processing, storing, routing, and/or providing traffic (e.g., a packet, a packet replica, other information or metadata, and/or the like) in a manner described herein. For example, node 220 may include a router, such as a label switching router (LSR), a label edge router (LER), an ingress router, an egress router, a provider router (e. g, a provider edge router, a provider core router, and/or the like), a virtual router, and/or the like. Additionally, or alternatively, node 220 may include a gateway, a switch, a firewall, a hub, a bridge, a reverse proxy, a server (e.g., a proxy server, a cloud server, a data center server, and/or the like), a load balancer, and/or the like. In some implementations, node 220 may be a physical device implemented within a housing, such as a chassis. In some implementations, node 220 may be a virtual device implemented by one or more computer devices of a cloud computing environment or a data center. In some implementations, a group of nodes 220 may be a group of nodes that are used to route traffic flow through network 240. In some implementations, a node 220 may function as a controller (e.g., node/controller 220-2), such as the controller described above with regard to FIGS. 1A-1O). In some implementations, the controller may be a device separate from nodes 220.

Terminating node 230 includes one or more devices capable of receiving, generating, storing, processing, and/or providing information, such as information described herein. For example, terminating node 230 may include a node 220, a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, and/or the like. In some implementations, terminating node 230 may receive network traffic from and/or may provide network traffic to other terminating nodes 230 and/or originating node 210 via network 240 (e.g., by routing packets using nodes 220 as intermediaries).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e. g., one or more devices) of environment 200 may perform one or more functions described as being performed by another set of devices of environment 200.

Figure 3:
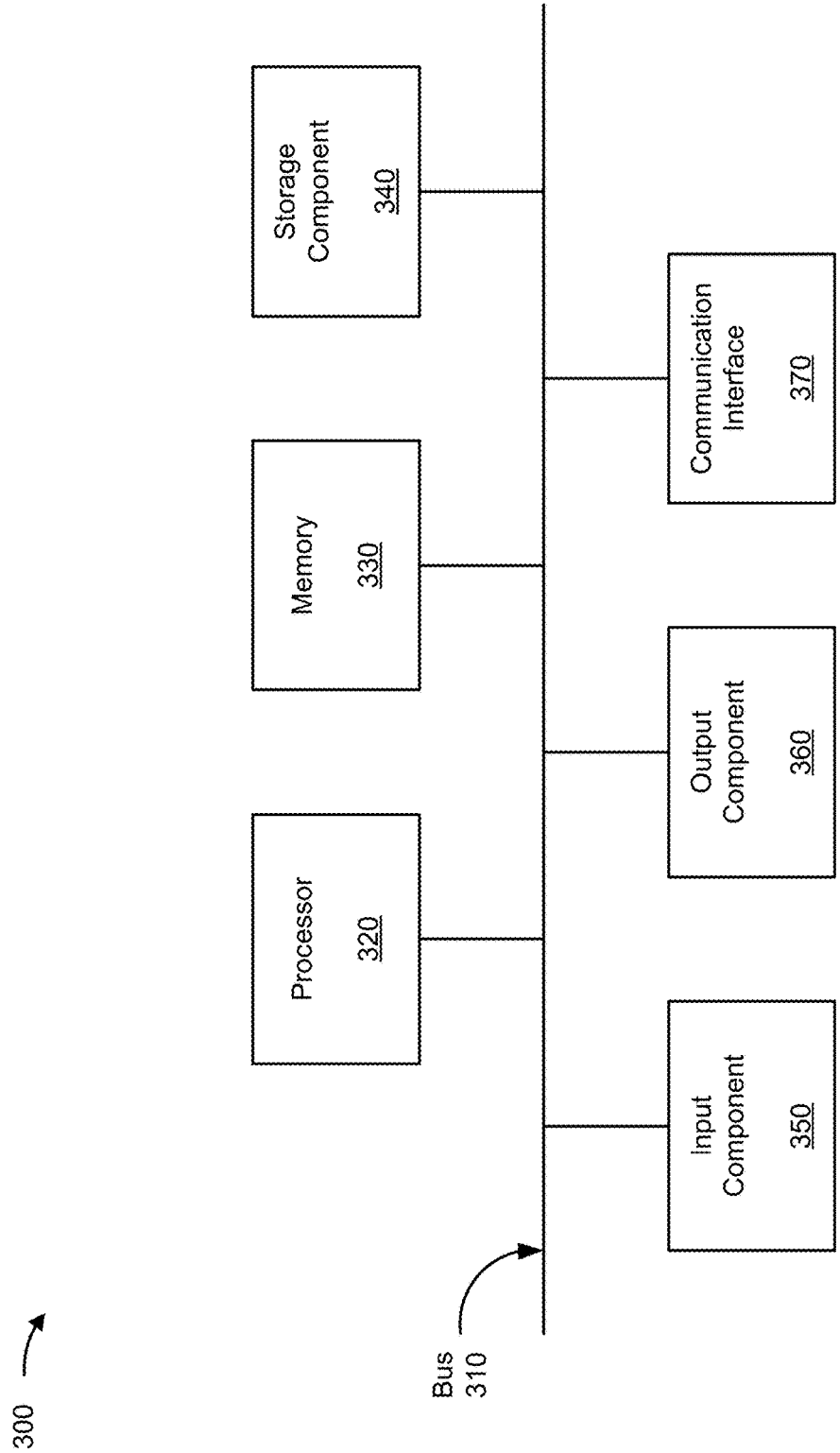
FIG. 3 is a diagram of example components of one or more devices of FIG. 2.

FIG. 3 is a diagram of example components of one or more devices of FIG. 2. FIG. 3 is a diagram of example components of a device 300. Device 300 may correspond to originating node 210, node 220, terminating node 230, and/or the like. In some implementations, originating node 210, node 220, terminating node 230, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
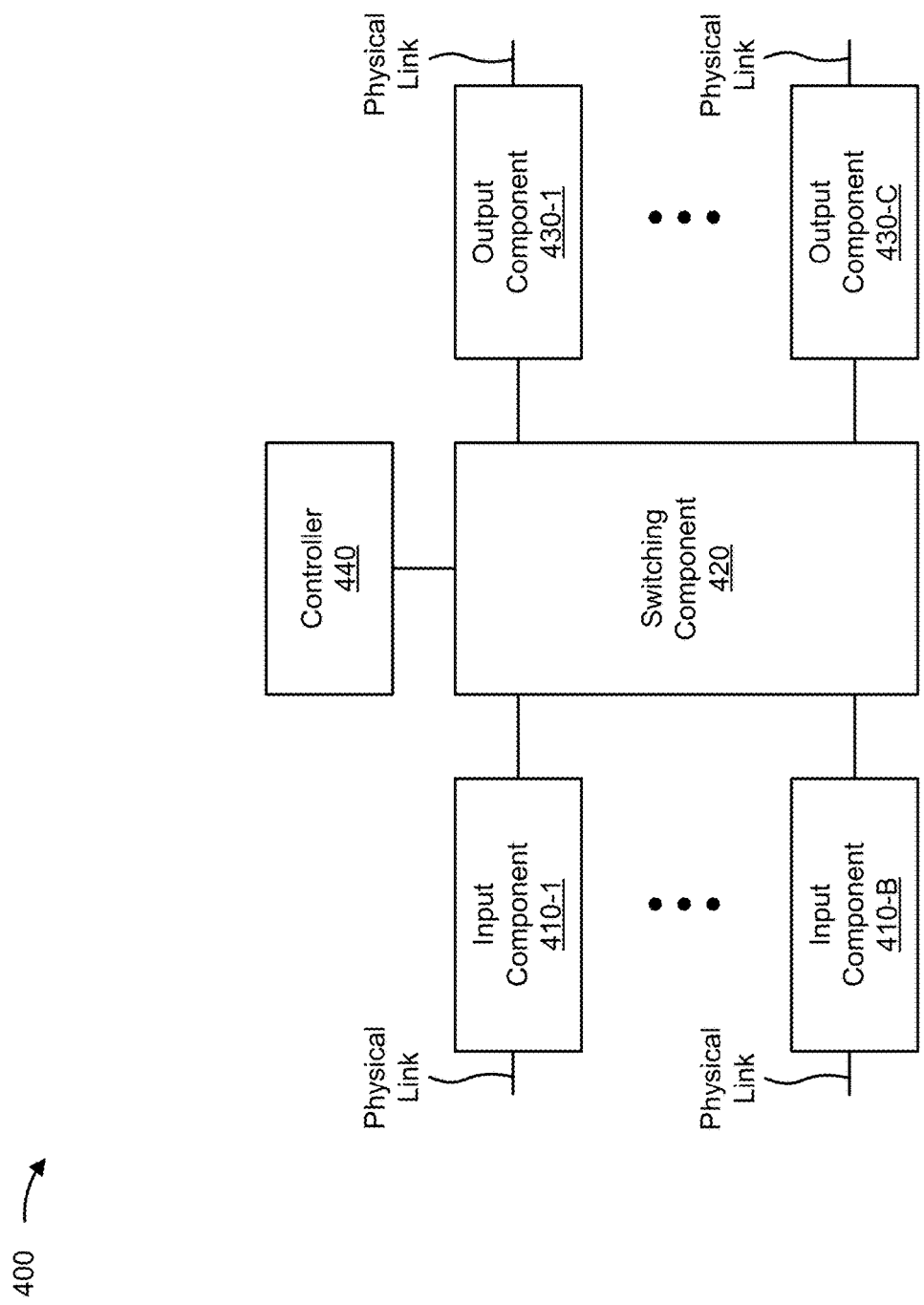
FIG. 4 is a diagram of example components of one or more devices of FIG. 2.

FIG. 4 is a diagram of example components of one or more devices of FIG. 2. FIG. 4 is a diagram of example components of a device 400. Device 400 may correspond to originating node 210, node 220, terminating node 230, and/or the like. In some implementations, originating node 210, node 220, terminating node 230, and/or the like may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be points of attachment for physical links and may be points of entry for incoming traffic, such as packets. Input component 410 may process incoming traffic, such as by performing data link layer encapsulation or decapsulation. In some implementations, input component 410 may send and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate.

Output component 430 may store packets and may schedule packets for transmission on output physical links. Output component 430 may support data link layer encapsulation or decapsulation, and/or a variety of higher-level protocols. In some implementations, output component 430 may send packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 300 to exchange information regarding network topology. Controller 440 may create routing tables based on the network topology information, create forwarding tables based on the routing tables, and forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
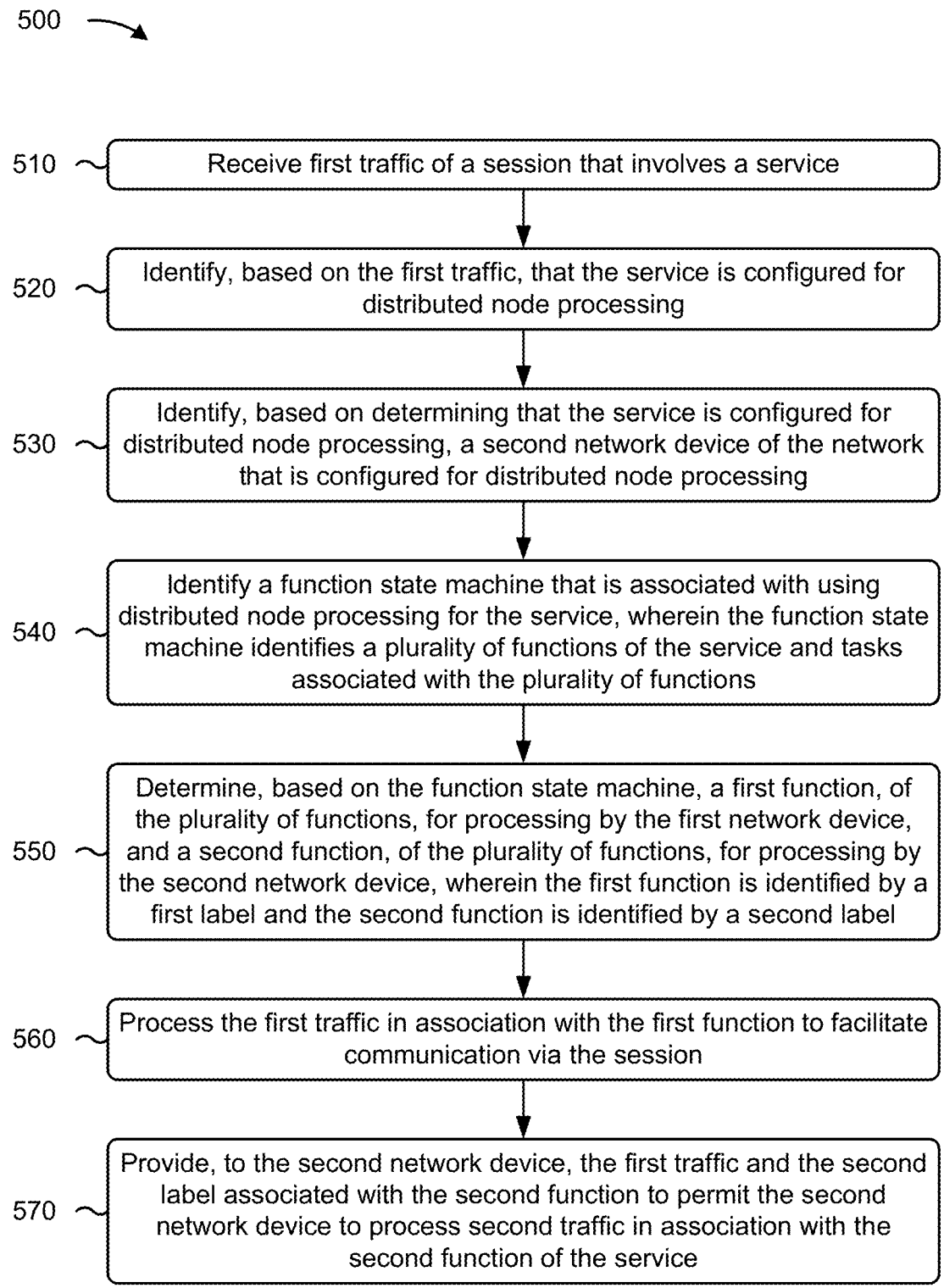
FIGS. 5-7 are flow charts of example processes relating to distributed node processing of network traffic.

FIG. 5 is a flow chart of an example process 500 associated with distributed node processing of network traffic. In some implementations, one or more process blocks of FIG. 5 may be performed by a first network device (e.g., node 220). In some implementations, one or more process blocks of FIG. 5 may be performed by another device or a group of devices separate from or including the first network device, such as a second network device (e.g., second node 220), an originating node (e.g., originating node 210), a terminating node (e.g., terminating node 230), and/or the like. Additionally, or alternatively, one or more process blocks of FIG. 5 may be performed by one or more components of a device 300, such as processor 320, memory 330, storage component 340, input component 350, output component 360, communication interface 370 input component 410, switching component 420, output component 430, controller 440, and/or the like.

As shown in FIG. 5, process 500 may include receiving first traffic of a session that involves a service (block 510). For example, the first network device may receive first traffic of a session that involves a service, as described above.

As further shown in FIG. 5, process 500 may include identifying, based on the first traffic, that the service is configured for distributed node processing (block 520). For example, the first network device may identify, based on the first traffic, that the service is configured for distributed node processing, as described above.

As further shown in FIG. 5, process 500 may include identifying, based on determining that the service is configured for distributed node processing, a second network device of the network that is configured for distributed node processing (block 530). For example, the first network device may identify, based on determining that the service is configured for distributed node processing, a second network device of the network that is configured for distributed node processing, as described above.

As further shown in FIG. 5, process 500 may include identifying a function state machine that is associated with using distributed node processing for the service, wherein the function state machine identifies a plurality of functions of the service and tasks associated with the plurality of functions (block 540). For example, the first network device may identify a function state machine that is associated with using distributed node processing for the service, as described above. In some implementations, the function state machine identifies a plurality of functions of the service and tasks associated with the plurality of functions.

As further shown in FIG. 5, process 500 may include determining, based on the function state machine, a first function, of the plurality of functions, for processing by the first network device, and a second function, of the plurality of functions, for processing by the second network device, wherein the first function is identified by a first label and the second function is identified by a second label (block 550). For example, the first network device may determine, based on the function state machine, a first function, of the plurality of functions, for processing by the first network device, and a second function, of the plurality of functions, for processing by the second network device, as described above. In some implementations, the first function is identified by a first label and the second function is identified by a second label.

As further shown in FIG. 5, process 500 may include processing the first traffic in association with the first function to facilitate communication via the session (block 560). For example, the first network device may process the first traffic in association with the first function to facilitate communication via the session, as described above.

As further shown in FIG. 5, process 500 may include providing, to the second network device, the first traffic and the second label associated with the second function to permit the second network device to process second traffic in association with the second function of the service (block 570). For example, the first network device may provide, to the second network device, the first traffic and the second label associated with the second function to permit the second network device to process second traffic in association with the second function of the service, as described above.

Process 500 may include additional implementations, such as any single implementation or any combination of implementations described below and/or in connection with one or more other processes described elsewhere herein.

In a first implementation, the first traffic is associated with one or more initial protocol data units of the session that are associated with initiating the session, the first function is associated with forwarding the first traffic to the second network device to initiate the session.

In a second implementation, alone or in combination with the first implementation, identifying that the service is associated with distributed node processing comprises: identifying, from the first traffic, a protocol of the session, and determining, based on the protocol, that distributed node processing is to be utilized to process the service.

In a third implementation, alone or in combination with one or more of the first and second implementations, the function state machine is stored in a first data structure of the first network device and a second data structure associated with the second network device, the function state machine indicates that the first label is associated with the first function and that the second label is associated with the second label.

In a fourth implementation, alone or in combination with one or more of the first through third implementations, process 500 includes identifying a traffic path of the session; determining, based on the function state machine, a first state transition associated with the first function and a second state transition associated with the second function, wherein the first is stating transition is determined based on the traffic path and receiving the first traffic; and determining that the second network device is configured to process the second function based on the traffic path of the session and a task, identified in the function state machine, that is associated with the second state transition, wherein the second function is being determined to be processed by the second network device based on determining that the second network device is configured to perform the task based on a location of the first network device and a location of the second network device within the traffic path.

In a fifth implementation, alone or in combination with one or more of the first through fourth implementations, a portion of the first function is processed during a same time period that the first traffic and the second label are provided to the second network device.

In a sixth implementation, alone or in combination with one or more of the first through fifth implementations, the first network device is an upstream node of a traffic path of the session and the second network device is a downstream node of the traffic path, and the first function is associated with establishing the session and the second function is establishing routing communications associated with the session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
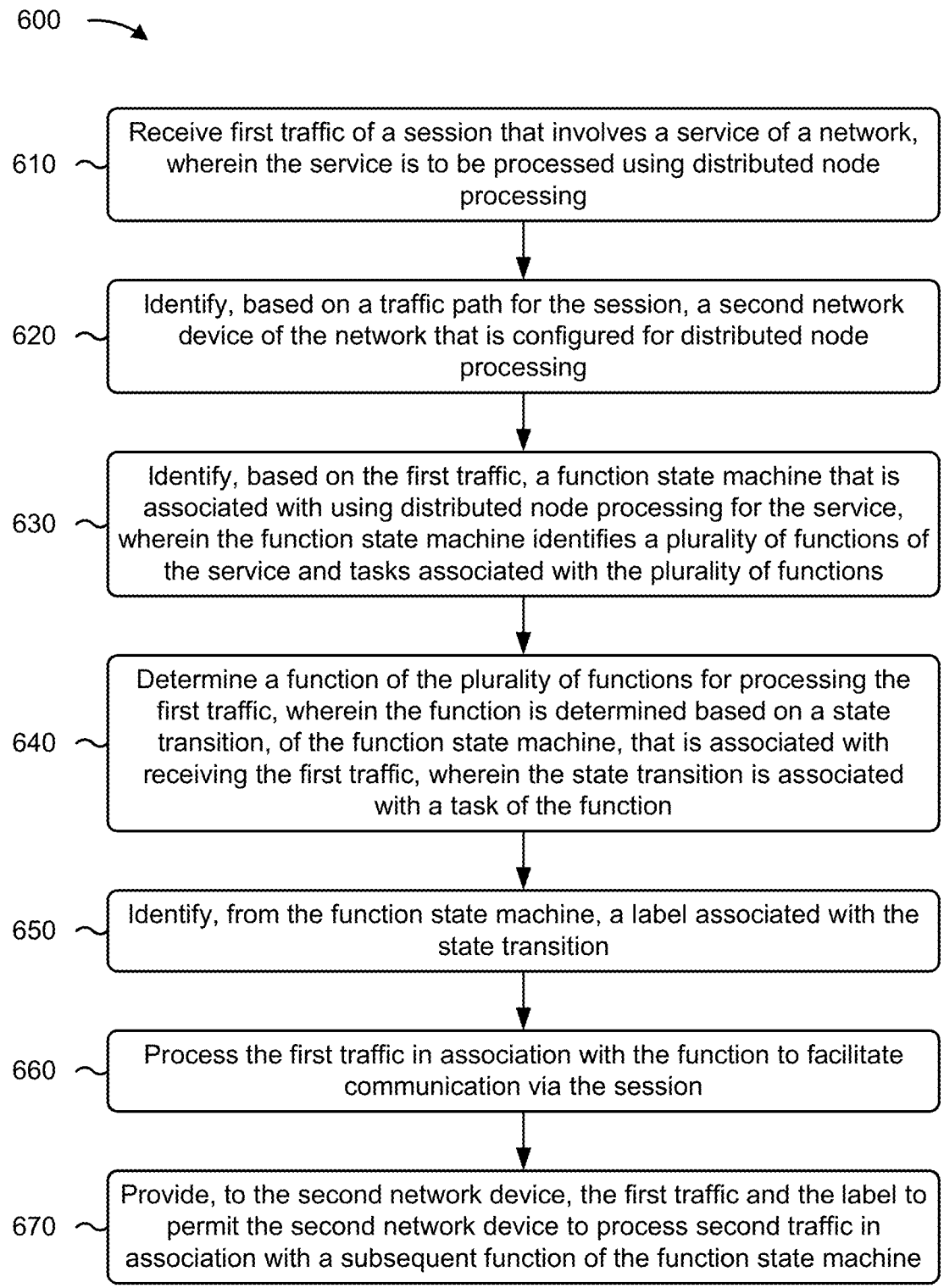

FIG. 6 is a flow chart of an example process 600 associated with distributed node processing of network traffic. In some implementations, one or more process blocks of FIG. 6 may be performed by a first network device (e.g., first node 220). In some implementations, one or more process blocks of FIG. 6 may be performed by another device or a group of devices separate from or including the first network device, such as a second network device (e.g., second node 220), an originating node (e.g., originating node 210), a terminating node (e.g., terminating node 230), and/or the like. Additionally, or alternatively, one or more process blocks of FIG. 6 may be performed by one or more components of a device 300, such as processor 320, memory 330, storage component 340, input component 350, output component 360, communication interface 370, input component 410, switching component 420, output component 430, controller 440, and/or the like.

As shown in FIG. 6, process 600 may include receiving first traffic of a session that involves a service of a network, wherein the service is to be processed using distributed node processing (block 610). For example, the first network device may receive first traffic of a session that involves a service of a network, as described above. In some implementations, the service is to be processed using distributed node processing.

As further shown in FIG. 6, process 600 may include identifying, based on a traffic path for the session, a second network device of the network that is configured for distributed node processing (block 620). For example, the first network device may identify, based on a traffic path for the session, a second network device of the network that is configured for distributed node processing, as described above.

As further shown in FIG. 6, process 600 may include identifying, based on the first traffic, a function state machine that is associated with using distributed node processing for the service, wherein the function state machine identifies a plurality of functions of the service and tasks associated with the plurality of functions (block 630). For example, the first network device may identify, based on the first traffic, a function state machine that is associated with using distributed node processing for the service, as described above. In some implementations, the function state machine identifies a plurality of functions of the service and tasks associated with the plurality of functions.

As further shown in FIG. 6, process 600 may include determining a function of the plurality of functions for processing the first traffic, wherein the function is determined based on a state transition, of the function state machine, that is associated with receiving the first traffic, wherein the state transition is associated with a task of the function (block 640). For example, the first network device may determine a function of the plurality of functions for processing the first traffic, as described above. In some implementations, the function is determined based on a state transition, of the function state machine, that is associated with receiving the first traffic. In some implementations, the state transition is associated with a task of the function.

As further shown in FIG. 6, process 600 may include identifying, from the function state machine, a label associated with the state transition (block 650). For example, the first network device may identify, from the function state machine, a label associated with the state transition, as described above.

As further shown in FIG. 6, process 600 may include processing the first traffic in association with the function to facilitate communication via the session (block 660). For example, the first network device may process the first traffic in association with the function to facilitate communication via the session, as described above.

As further shown in FIG. 6, process 600 may include providing, to the second network device, the first traffic and the label to permit the second network device to process second traffic in association with a subsequent function of the function state machine (block 670). For example, the first network device may provide, to the second network device, the first traffic and the label to permit the second network device to process second traffic in association with a subsequent function of the function state machine, as described above.

Process 600 may include additional implementations, such as any single implementation or any combination of implementations described below and/or in connection with one or more other processes described elsewhere herein.

In a first implementation, process 600 includes identifying, in the first traffic, a received label associated with processing the first traffic in association with the function according to a previous state transition of the function state machine; and identifying, based on the received label, that the second network device is configured for distributed node processing, wherein the function is stating machine is identified based on determining that the second network device is configured for distributed node processing.

In a second implementation, alone or in combination with the first implementation, the function is determined based on a position of the state transition within the function state machine and a location of the first network device within the traffic path.

In a third implementation, alone or in combination with one or more of the first and second implementations, the function state machine is stored in a data structure of the network that is accessible to the first network device and the second network device, identifying the function state machine comprises: accessing the data structure, and identifying, from the data structure, the function state machine based on the data structure mapping an identifier of the service to the function state machine.

In a fourth implementation, alone or in combination with one or more of the first through third implementations, identifying the label comprises: identifying that the state transition is mapped to the label in the function state machine, the label is configured to cause the second network device to process the second traffic in association with the subsequent function, and selecting, based on the state transition being mapped to the label, the label from the function state machine.

In a fifth implementation, alone or in combination with one or more of the first through fourth implementations, process 600 includes receiving the second traffic; determining, based on the function state machine, that the second traffic is associated with a second state transition; identifying, from the function state machine, a second label that is associated with the second state transition; and forward the second traffic and the second label to the second network device to is permitting the second network device to process the second traffic.

In a sixth implementation, alone or in combination with one or more of the first through fifth implementations, the session is associated with an application, and the service is associated with at least one of: a policy enforcement service of the application, a routing service of the application, or a caching service of the application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
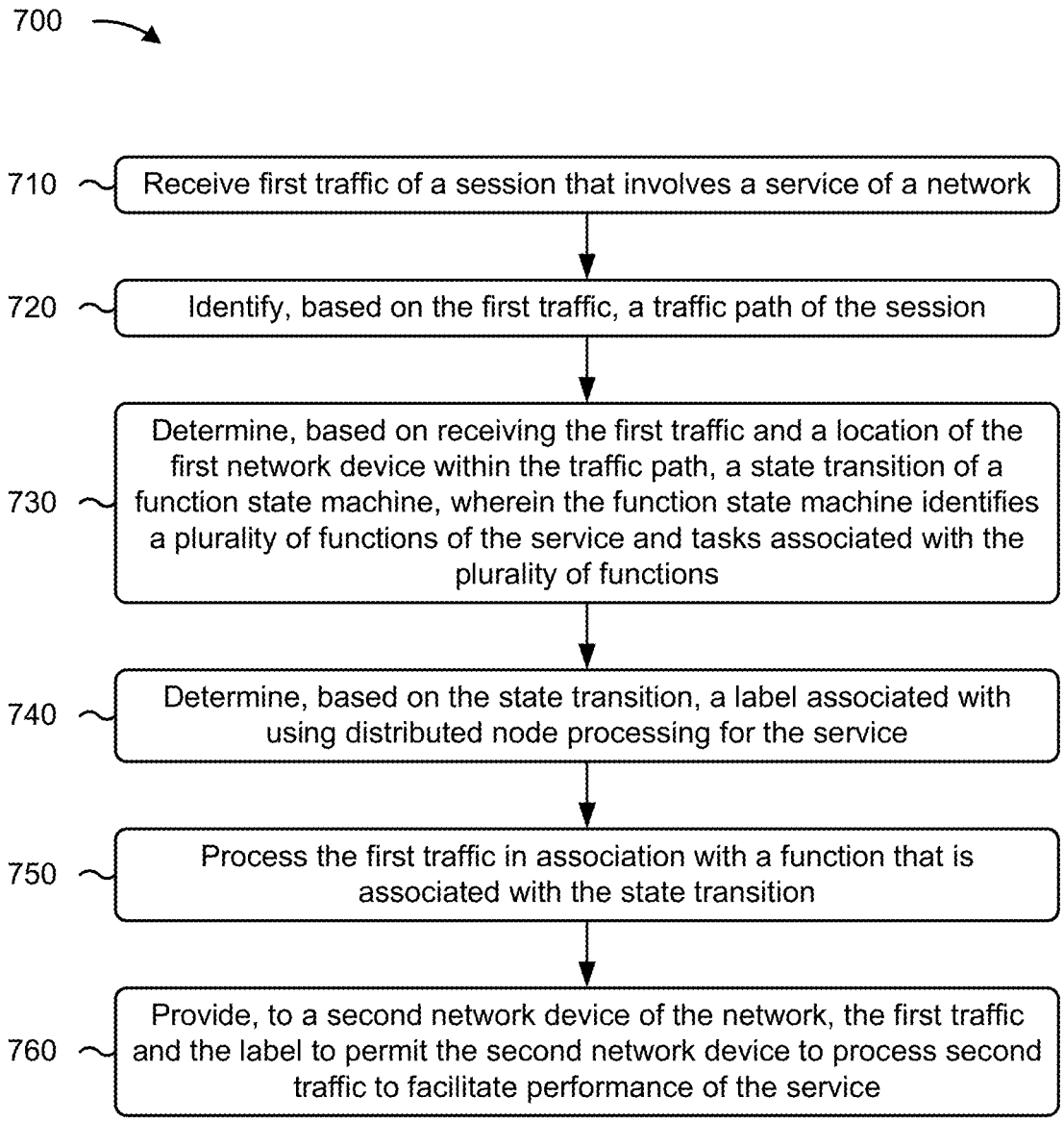

FIG. 7 is a flow chart of an example process 700 associated with distributed node processing of network traffic. In some implementations, one or more process blocks of FIG. 7 may be performed by a first network device (e.g., first node 220). In some implementations, one or more process blocks of FIG. 7 may be performed by another device or a group of devices separate from or including the first network device, such as a second network device (e.g., second node 220), an originating node (e.g., originating node 210), a terminating node (e.g., terminating node 230), and/or the like. Additionally, or alternatively, one or more process blocks of FIG. 7 may be performed by one or more components of a device 300, such as processor 320, memory 330, storage component 340, input component 350, output component 360, communication interface 370, input component 410, switching component 420, output component 430, controller 440, and/or the like.

As shown in FIG. 7, process 700 may include receiving first traffic of a session that involves a service of a network (block 710). For example, the first network device may receive first traffic of a session that involves a service of a network, as described above.

As further shown in FIG. 7, process 700 may include identifying, based on the first traffic, a traffic path of the session (block 720). For example, the first network device may identify, based on the first traffic, a traffic path of the session, as described above.

As further shown in FIG. 7, process 700 may include determining, based on receiving the first traffic and a location of the first network device within the traffic path, a state transition of a function state machine, wherein the function state machine identifies a plurality of functions of the service and tasks associated with the plurality of functions (block 730). For example, the first network device may determine, based on receiving the first traffic and a location of the first network device within the traffic path, a state transition of a function state machine, as described above. In some implementations, the function state machine identifies a plurality of functions of the service and tasks associated with the plurality of functions.

As further shown in FIG. 7, process 700 may include determining, based on the state transition, a label associated with using distributed node processing for the service (block 740). For example, the first network device may determine, based on the state transition, a label associated with using distributed node processing for the service, as described above.

As further shown in FIG. 7, process 700 may include processing the first traffic in association with a function that is associated with the state transition (block 750). For example, the first network device may process the first traffic in association with a function that is associated with the state transition, as described above.

As further shown in FIG. 7, process 700 may include providing, to a second network device of the network, the first traffic and the label to permit the second network device to process second traffic to facilitate performance of the service (block 760). For example, the first network device may provide, to a second network device of the network, the first traffic and the label to permit the second network device to process second traffic to facilitate performance of the service, as described above.

Process 700 may include additional implementations, such as any single implementation or any combination of implementations described below and/or in connection with one or more other processes described elsewhere herein.

In a first implementation, the first traffic is associated with initiating the session and the function is associated with classifying the service, and the second traffic is associated with caching content associated with the session.

In a second implementation, alone or in combination with the first implementation, process 700 includes providing the label to identify the state transition according to at least one of: a border gateway protocol, an RSVP path signaling protocol, or an application information distribution protocol.

In a third implementation, alone or in combination with one or more of the first and second implementations, the first network device and the second network device are configured to utilize distributed node processing based on the first network device and the second network device being configured to access a data structure that includes the function state machine.

In a fourth implementation, alone or in combination with one or more of the first through third implementations, the state transition is a first state transition, and receive the second traffic; determine, based on the function state machine, that the second traffic is associated with a second state transition that follows the first state transition according to the function state machine, and forward the second traffic to the second network device.

In a fifth implementation, alone or in combination with one or more of the first through fourth implementations, the first network device comprises a provider edge device at a first edge of the network and the second network device comprises a provider edge device at a second edge of the network.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a first network device of a network, first traffic of a session that involves a service;
  identifying, by the first network device and based on the first traffic, that the service is configured for distributed node processing;

identifying, by the first network device and based on determining that the service is configured for distributed node processing, a second network device of the network that is configured for distributed node processing;

identifying, by the first network device, a function state machine that is associated with using distributed node processing for the service,
 wherein the function state machine identifies a plurality of functions of the service and tasks associated with the plurality of functions;

determining, by the first network device and based on the function state machine, a first function, of the plurality of functions, for processing by the first network device, and a second function, of the plurality of functions, for processing by the second network device,
 wherein the first function is identified by a first label and the second function is identified by a second label;

processing, by the first network device, the first traffic in association with the first function to facilitate communication via the session; and providing, by the first network device and to the second network device, the first traffic and the second label associated with the second function to permit the second network device to process second traffic in association with the second function of the service.

2. The method of claim 1, wherein the first traffic is associated with one or more initial protocol data units of the session that are associated with initiating the session,
 wherein the first function is associated with forwarding the first traffic to the second network device to initiate the session.

3. The method of claim 1, wherein identifying that the service is associated with distributed node processing comprises:
 identifying, from the first traffic, a protocol of the session; and
 determining, based on the protocol, that distributed node processing is to be utilized to process the service.

4. The method of claim 1, wherein the function state machine is stored in a first data structure of the first network device and a second data structure associated with the second network device,
 wherein the function state machine indicates that the first label is associated with the first function and that the second label is associated with the second label.

5. The method of claim 1, further comprising, prior to determining the first function and the second function:
 identifying a traffic path of the session;
 determining, based on the function state machine, a first state transition associated with the first function and a second state transition associated with the second function,
  wherein the first state transition is determined based on the traffic path and receiving the first traffic; and
 determining that the second network device is configured to process the second function based on the traffic path of the session and a task, identified in the function state machine, that is associated with the second state transition,
  wherein the second function is determined to be processed by the second network device based on determining that the second network device is configured to perform the task based on a location of the first network device and a location of the second network device within the traffic path.

6. The method of claim 1, wherein a portion of the first function is processed during a same time period that the first traffic and the second label are provided to the second network device.

7. The method of claim 1, wherein the first network device is an upstream node of a traffic path of the session and the second network device is a downstream node of the traffic path, and
 wherein the first function is associated with establishing the session and the second function is establishing routing communications associated with the session.

8. A first network device, comprising:
one or more memories; and
one or more processors to:
 receive first traffic of a session that involves a service of a network,
  wherein the service is to be processed using distributed node processing;
 identify, based on a traffic path for the session, a second network device of the network that is configured for distributed node processing;
 identify, based on the first traffic, a function state machine that is associated with using distributed node processing for the service,
  wherein the function state machine identifies a plurality of functions of the service and tasks associated with the plurality of functions;
 determine a function of the plurality of functions for processing the first traffic,
  wherein the function is determined based on a state transition, of the function state machine, that is associated with receiving the first traffic,
   wherein the state transition is associated with a task of the function;
 identify, from the function state machine, a label associated with the state transition;
 process the first traffic in association with the function to facilitate communication via the session; and
 provide, to the second network device, the first traffic and the label to permit the second network device to process second traffic in association with a subsequent function of the function state machine.

9. The first network device of claim 8, wherein the one or more processors, prior to identifying the second network device, are to:
 identify, in the first traffic, a received label associated with processing the first traffic in association with the function according to a previous state transition of the function state machine; and
 identify, based on the received label, that the second network device is configured for distributed node processing,
  wherein the function state machine is identified based on determining that the second network device is configured for distributed node processing.

10. The first network device of claim 8, wherein the function is determined based on a position of the state transition within the function state machine and a location of the first network device within the traffic path.

11. The first network device of claim 8, wherein the function state machine is stored in a data structure of the network that is accessible to the first network device and the second network device,
 wherein identifying the function state machine comprises:
  accessing the data structure; and identifying, from the data structure, the function state machine based on the data structure mapping an identifier of the service to the function state machine.

12. The first network device of claim 8, wherein identifying the label comprises:
identifying that the state transition is mapped to the label in the function state machine,
wherein the label is configured to cause the second network device to process the second traffic in association with the subsequent function; and
selecting, based on the state transition being mapped to the label, the label from the function state machine.

13. The first network device of claim 8, wherein the label is a first label, and the one or more processors are further configured to:
receive the second traffic;
determine, based on the function state machine, that the second traffic is associated with a second state transition;
identify, from the function state machine, a second label that is associated with the second state transition; and
forward the second traffic and the second label to the second network device to permit the second network device to process the second traffic.

14. The first network device of claim 8, wherein the session is associated with an application, and the service is associated with at least one of:
a policy enforcement service of the application,
a routing service of the application, or
a caching service of the application.

15. A non-transitory computer-readable medium storing instructions, the instructions comprising:
one or more instructions that, when executed by one or more processors of a first network device, cause the one or more processors to:
receive first traffic of a session that involves a service of a network;
identify, based on the first traffic, a traffic path of the session;
determine, based on receiving the first traffic and a location of the first network device within the traffic path, a state transition of a function state machine,
wherein the function state machine identifies a plurality of functions of the service and tasks associated with the plurality of functions;
determine, based on the state transition, a label associated with using distributed node processing for the service;
process the first traffic in association with a function that is associated with the state transition; and
provide, to a second network device of the network, the first traffic and the label to permit the second network device to process second traffic to facilitate performance of the service.

16. The non-transitory computer-readable medium of claim 15, wherein the first traffic is associated with initiating the session and the function is associated with classifying the service, and
wherein the second traffic is associated with caching content associated with the session.

17. The non-transitory computer-readable medium of claim 15, wherein the one or more instructions, that cause the one or more processors to provide the label, cause the one or more processors to:
provide the label to identify the state transition according to at least one of:
a border gateway protocol,
an RSVP path signaling protocol, or
an application information distribution protocol.

18. The non-transitory computer-readable medium of claim 15, wherein the first network device and the second network device are configured to utilize distributed node processing based on the first network device and the second network device being configured to access a data structure that includes the function state machine.

19. The non-transitory computer-readable medium of claim 15, wherein the state transition is a first state transition, and
wherein the one or more instructions, when executed by the one or more processors, further cause the one or more processors to:
receive the second traffic;
determine, based on the function state machine, that the second traffic is associated with a second state transition that follows the first state transition according to the function state machine; and
forward the second traffic to the second network device.

20. The non-transitory computer-readable medium of claim 15, wherein the first network device comprises a provider edge device at a first edge of the network and the second network device comprises a provider edge device at a second edge of the network.

* * * * *